US011363638B2

(12) United States Patent
Takahashi et al.

(10) Patent No.: US 11,363,638 B2
(45) Date of Patent: Jun. 14, 2022

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG INNOVATION COMPANY LIMITED, Tuen Mun (HK)

(72) Inventors: Hiroki Takahashi, Sakai (JP); Shohei Yamada, Sakai (JP); Hidekazu Tsuboi, Sakai (JP); Kazunari Yokomakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/763,324

(22) PCT Filed: Nov. 15, 2018

(86) PCT No.: PCT/JP2018/042277
§ 371 (c)(1),
(2) Date: May 12, 2020

(87) PCT Pub. No.: WO2019/098268
PCT Pub. Date: May 23, 2019

(65) Prior Publication Data
US 2021/0176789 A1      Jun. 10, 2021

(30) Foreign Application Priority Data

Nov. 15, 2017   (JP) .............................. JP2017-219905

(51) Int. Cl.
*H04W 4/00*         (2018.01)
*H04W 74/08*        (2009.01)
(Continued)

(52) U.S. Cl.
CPC ....... *H04W 74/0833* (2013.01); *H04L 5/0048* (2013.01); *H04W 72/042* (2013.01)

(58) Field of Classification Search
CPC ............ H04W 74/0833; H04W 72/042; H04L 5/0048
(Continued)

(56) References Cited

U.S. PATENT DOCUMENTS

2016/0219619 A1* 7/2016 Guo ....................... H04W 72/14
2021/0127424 A1* 4/2021 Yasukawa ........... H04W 56/001

FOREIGN PATENT DOCUMENTS

JP      2016-140062 A    8/2016
WO      2017/135455 A1   8/2017

OTHER PUBLICATIONS

Qualcomm ( "Summary of Remaining Details on RACH Procedure", R1-1718937, Prague, CZ, Oct. 9-13, 2017) (Year: 2017).*
(Continued)

*Primary Examiner* — Maharishi V Khirodhar
(74) *Attorney, Agent, or Firm* — ScienBiziP, P.C.

(57) ABSTRACT

A terminal apparatus receives first information for identifying one or multiple random access channel occasions, and receives second information for identifying an index of a random access preamble. In a case that a first condition is satisfied, the terminal apparatus selects, from one or multiple reference signals, one reference signal based on a measurement of each of the one or multiple reference signals. In a case that a second condition is satisfied, the terminal apparatus selects one reference signal of the one or multiple reference signals associated with a PDCCH used to receive the second information. The terminal apparatus selects, from the one or multiple random access channel occasions, one random access channel occasion associated with the one reference signal selected.

7 Claims, 16 Drawing Sheets

(51) Int. Cl.
*H04L 5/00* (2006.01)
*H04W 72/04* (2009.01)

(58) Field of Classification Search
USPC .......................................................... 370/329
See application file for complete search history.

(56) References Cited

OTHER PUBLICATIONS

NTT DOCOMO, "Revision of SI: Study on New Radio Access Technology", 3GPP TSG RAN Meeting #72, RP-161214, Jun. 13-16, 2016, 8 pages.
Nokia et al., "Basic principles for the 5G New Radio access technology", 3GPP TSG-RAN WG1 #84bis, R1-162883, Apr. 11-15, 2016, 6 pages.
Intel Corporation, "Overview of antenna technology for new radio interface", 3GPP TSG-RAN WG1 #84bis, R1-162380, Apr. 11-15, 2016, pp. 1-3.
Ericsson, "Overview of NR", TSG-RAN WG1 #84bis, R1-163215, Apr. 11-15, 2016, 2 pages.
Catt, "Further details on NR 4-step RA Procedure", R1-1717803, 3GPP TSG RAN WG1 Meeting #90bis, Prague, CZ, Oct. 9-13, 2017.
NTT Docomo, Inc., "Discussion on remaining details on RACH procedure", R1-1718184, 3GPP TSG RAN WG1 Meeting 90bis, Prague, CZ, Oct. 9-13, 2017.
Motorola Mobility et al., "RACH resource configuration and selection", R1-1714216, 3GPP TSG RAN WG1 Meeting #90, Prague, Czech Republic, Aug. 21-25, 2017.

\* cited by examiner

| RANDOM ACCESS CONFIGURATION INFORMATION CORRESPONDING TO FIRST SS BLOCK | AVAILABLE PREAMBLE GROUP |
| --- | --- |
| | AVAILABLE FREQUENCY/TIME RESOURCE SET |
| | OTHER INFORMATION |
| RANDOM ACCESS CONFIGURATION INFORMATION CORRESPONDING TO SECOND SS BLOCK | AVAILABLE PREAMBLE GROUP |
| | AVAILABLE FREQUENCY/TIME RESOURCE SET |
| | OTHER INFORMATION |

FIG. 8

| | |
|---|---|
| PREAMBLE GROUP FOR CONTENTION BASED RANDOM ACCESS CORRESPONDING TO FIRST REFERENCE SIGNAL | INDICES : 0-12 |
| PREAMBLE GROUP FOR NON-CONTENTION BASED RANDOM ACCESS | INDICES : 13-15 |
| PREAMBLE GROUP FOR CONTENTION BASED RANDOM ACCESS CORRESPONDING TO SECOND REFERENCE SIGNAL | INDICES : 16-28 |
| PREAMBLE GROUP FOR NON-CONTENTION BASED RANDOM ACCESS | INDICES : 29-31 |
| PREAMBLE GROUP FOR CONTENTION BASED RANDOM ACCESS CORRESPONDING TO THIRD REFERENCE SIGNAL | INDICES : 32-44 |
| PREAMBLE GROUP FOR NON-CONTENTION BASED RANDOM ACCESS | INDICES : 45-47 |
| PREAMBLE GROUP FOR CONTENTION BASED RANDOM ACCESS CORRESPONDING TO FOURTH REFERENCE SIGNAL | INDICES : 48-60 |
| PREAMBLE GROUP FOR NON-CONTENTION BASED RANDOM ACCESS | INDICES : 60-63 |

FIG. 13

TERMINAL APPARATUS, BASE STATION APPARATUS, COMMUNICATION METHOD, AND INTEGRATED CIRCUIT

CROSS-REFERENCE TO RELATED APPLICATION(S)

This application is a national stage application, filed under 35 U.S.C. § 371, of International Patent Application No. PCT/JP2018/042277, filed on Nov. 15, 2018, which claims the benefit of Japan Patent Application No. 2017-219905, filed on Nov. 15, 2017, each of which is fully incorporated herein by reference for all purposes.

TECHNICAL FIELD

The present invention relates to a terminal apparatus, a base station apparatus, a communication method, and an integrated circuit.

This application claims priority based on JP 2017-219905 filed on Nov. 15, 2017, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

In NR, a technical study concerning massive Multiple-Input Multiple-Output (MIMO), in which coverage is secured with a beamforming gain by using a large number of antenna elements in a high frequency, has been conducted (NPL 2, NPL 3, and NPL 4).

CITATION LIST

Non Patent Literature

NPL 1: RP-161214 NTT DOCOMO, "Revision of SI: Study on New Radio Access Technology", June 2016
NPL 2: R1-162883 Nokia, Alcatel-Lucent Shanghai Bell, "Basic Principles for the 5G New Radio Access technology", April 2016
NPL 3: R1-162380, Intel Corporation, "Overview of antenna technology for new radio interface", April 2016
NPL 4: R1-163215, Ericsson, "Overview of NR", April 2016

SUMMARY OF INVENTION

Technical Problem

One aspect of the present invention provides a terminal apparatus capable of efficiently communicating with a base station apparatus, a base station apparatus communicating with the terminal apparatus, a communication method used for the terminal apparatus, and a communication method used for the base station apparatus. For example, the communication methods used for the terminal apparatus and the base station apparatus may include an uplink transmission method, a modulation method, and/or a coding method for achieving efficient communication, reducing complexity, and reducing interference between cells and/or between terminal apparatuses.

Solution to Problem (1) According to some aspects of the present invention, the following measures are provided. Specifically, a first aspect of the present invention is a terminal apparatus including: a receiver configured to receive first information for identifying one or multiple random access channel occasions, and receive second information for identifying an index of a random access preamble; and a selection unit configured to in a case that a first condition is satisfied, select, from one or multiple reference signals, one reference signal, based on a measurement of each of the one or multiple reference signals, in a case that a second condition is satisfied, select one reference signal of the one or multiple reference signals associated with a physical downlink control channel used to receive the second information, and select, from the one or multiple random access channel occasions, one random access channel occasion associated with the one reference signal selected.

(2) A second aspect of the present invention is a base station apparatus for communicating with a terminal apparatus, the base station apparatus including: a transmitter configured to transmit one or multiple reference signals, transmit first information for identifying one or multiple random access channel occasions, and transmit second information for identifying an index of a random access preamble, to the terminal apparatus; and a monitor unit configured to in a case that a first condition is satisfied, monitor the random access preamble transmitted from the terminal apparatus 1 in a random access channel occasion of the one or multiple random access channel occasions assigned for each of the one or multiple reference signals, and in a case that a second condition is satisfied, monitor the random access preamble transmitted from the terminal apparatus in the random access channel occasion assigned for one of the one or multiple reference signals associated with a physical downlink control channel used to transmit the second information.

(3) A third aspect of the present invention is a communication method used for a terminal apparatus, the communication method including: receiving first information for identifying one or multiple random access channel occasions, and receiving second information for identifying an index of a random access preamble; in a case that a first condition is satisfied, selecting, from one or multiple reference signals, one reference signal based on a measurement of each of the one or multiple reference signals; in a case that a second condition is satisfied, selecting one reference signal of the one or multiple reference signals associated with a physical downlink control channel used to receive the second information; and selecting, from the one or multiple random access channel occasions, one random access channel occasion associated with the one reference signal selected.

(4) A fourth aspect of the present invention is a communication method used for a base station apparatus, the communication method including: transmitting one or multiple reference signals, transmitting first information for identifying one or multiple random access channel occasions, and transmitting second information for identifying an index of a random access preamble, to a terminal apparatus; in a case that a first condition is satisfied, monitoring the random access preamble transmitted from the terminal apparatus 1 in a random access channel occasion of the one or multiple random access channel occasions assigned for each of the one or multiple reference signals; and in a case that a second condition is satisfied, monitoring the random access preamble transmitted from the terminal apparatus in the random access channel occasion assigned for one of the one or multiple reference signals associated with a physical downlink control channel used to transmit the second information.

(5) A fifth aspect of the present invention is an integrated circuit to be mounted on a terminal apparatus, the integrated circuit causing the terminal apparatus to perform: receiving first information for identifying one or multiple random access channel occasions, and receiving second information for identifying an index of a random access preamble; and in a case that a first condition is satisfied, selecting, from one or multiple reference signals, one reference signal based on a measurement of each of the one or multiple reference signals, in a case that a second condition is satisfied, selecting one reference signal of the one or multiple reference signals associated with a physical downlink control channel used to receive the second information, and selecting, from the one or multiple random access channel occasions, one random access channel occasion associated with the one reference signal selected.

(6) A sixth aspect of the present invention is an integrated circuit to be mounted on a base station apparatus, the integrated circuit causing the base station apparatus to perform: transmitting one or multiple reference signals, transmitting first information for identifying one or multiple random access channel occasions, and transmitting second information for identifying an index of a random access preamble, to a terminal apparatus; and in a case that a first condition is satisfied, monitoring the random access preamble transmitted from the terminal apparatus 1 in a random access channel occasion of the one or multiple random access channel occasions assigned for each of the one or multiple reference signals, and in a case that a second condition is satisfied, monitoring the random access preamble transmitted from the terminal apparatus in the random access channel occasion assigned for one of the one or multiple reference signals associated with a physical downlink control channel used to transmit the second information.

Advantageous Effects of Invention

According to one aspect of the present invention, a terminal apparatus and a base station apparatus can efficiently communicate with each other and/or reduce complexity.

BRIEF DESCRIPTION OF DRAWINGS

FIG. 8 is a diagram illustrating an example of a configuration of random access configuration information according to an embodiment of the present invention.

FIG. 13 is a diagram illustrating an example of assignment of preamble indices.

DESCRIPTION OF EMBODIMENTS

Embodiments of the present invention will be described below.

LTE (and LTE-Advanced Pro) and NR may be defined as different Radio Access Technologies (RATs). NR may be defined as a technology included in LTE. The present embodiment may be applied to NR, LTE and other RATs. Terms associated with LTE are used in the following description. However, the present invention may be applied to other technologies using other terms.

Figure 1:
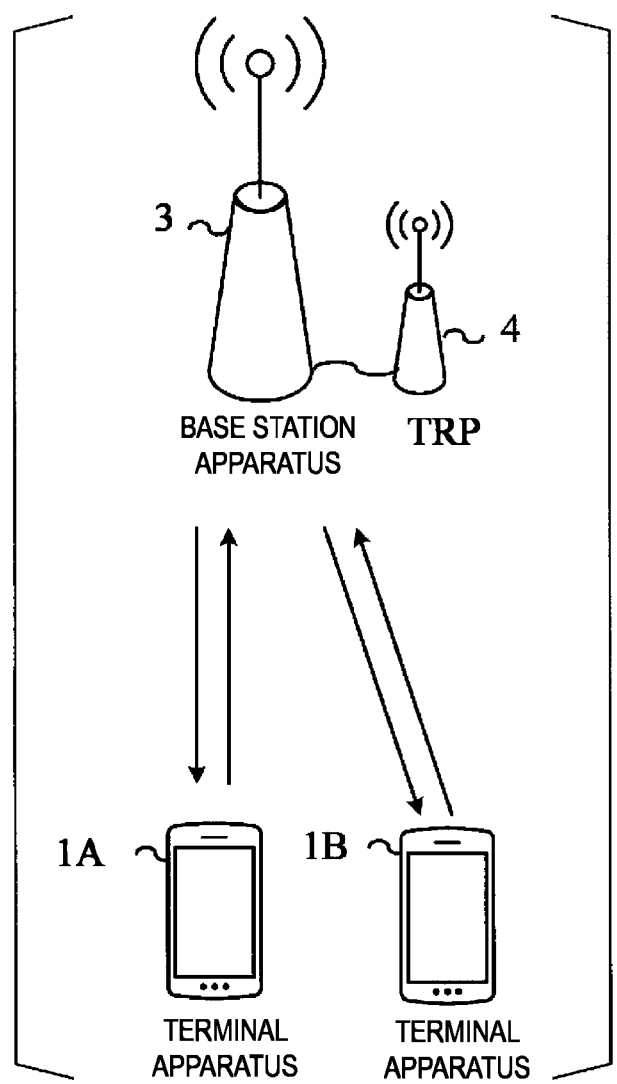
FIG. 1 is a conceptual diagram of a radio communication system according to an embodiment of the present embodiment.

FIG. 1 is a conceptual diagram of a radio communication system according to an embodiment of the present invention. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1.

The terminal apparatus 1 may be referred to as a mobile station apparatus, a user terminal (User Equipment (UE)), a communication terminal, a mobile device, a terminal, a Mobile Station (MS), or the like. The base station apparatus 3 may be referred to as a radio base station apparatus, a base station, a radio base station, a fixed station, a Node B (NB), an evolved Node B (eNB), an NR Node B (NR NB), a next generation Node B (gNB), an access point, a Base Transceiver Station (BTS), a Base Station (BS), or the like. The base station apparatus 3 may include a core network apparatus. Furthermore, the base station apparatus 3 may include one or more transmission reception points 4 (TRPs). At least a part of functionality/processing of the base station apparatus 3 described below may be functionality/processing of each transmission reception point 4 included in the base station apparatus 3. The base station apparatus 3 may have a communicable range (communication area), controlled by the base station apparatus 3, that includes one or more cells to serve the terminal apparatus 1. Furthermore, the base station apparatus 3 may have a communicable range (communication area), controlled by one or more transmission reception points 4, that includes one or more cells to serve the terminal apparatus 1. Furthermore, one cell may be divided into multiple beamed areas, and the terminal apparatus 1 may be served in each of the Beamed areas. Here, a beamed area may be identified based on a beam index used for beamforming or a precoding index.

The communication area covered by the base station apparatus 3 may be different in size and shape for each frequency. Moreover, the covered area may be different for each frequency. Furthermore, a radio network, in which cells having different types of base station apparatuses 3 and different cell radii coexist on the same frequency or different frequencies to form one communication system, is referred to as a heterogeneous network.

A radio communication link from the base station apparatus 3 to the terminal apparatus 1 is referred to as a downlink. A radio communication link from the terminal apparatus 1 to the base station apparatus 3 is referred to as an uplink. A radio communication link from the terminal apparatus 1 to another terminal apparatus 1 is referred to as a sidelink.

In FIG. 1, Orthogonal Frequency Division Multiplexing (OFDM) including Cyclic Prefix (CP), Single Carrier Frequency Division Multiplexing (SC-FDM), Discrete Fourier Transform Spread OFDM (DFT-S-OFDM), and Multi-Carrier Code Division Multiplexing (MC-CDM) may be employed for radio communication between the terminal apparatus 1 and the base station apparatus 3 and/or the radio communication between the terminal apparatus 1 and another terminal apparatus 1.

In FIG. 1, in the radio communication between the terminal apparatus 1 and the base station apparatus 3 and/or the radio communication between the terminal apparatus 1 and the other terminal apparatus 1, Universal-Filtered Multi-Carrier (UFMC), Filtered OFDM (F-OFDM), OFDM in which a window is multiplied (Windowed OFDM), and Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention. For example, the OFDM symbol in the present embodiment may be a Single-Carrier Frequency Division Multiple Access symbol (which may be referred to as an SC-FDMA (SC-FDM) symbol).

In FIG. 1, the aforementioned transmission scheme that uses no CP or uses zero padding instead of the CP may be employed for the radio communication between the terminal apparatus 1 and the base station apparatus 3 and/or the radio communication between the terminal apparatus 1 and the other terminal apparatus 1. Moreover, the CP or zero padding may be added both forward and backward.

According to the present embodiment, one or more serving cells are configured for the terminal apparatus 1. The multiple configured serving cells include one Primary Cell (also referred to as a PCell) and one or multiple Secondary Cells (also referred to as SCells). The primary cell is a serving cell in which an initial connection establishment procedure has been performed, a serving cell in which a connection re-establishment procedure has been initiated, or a cell indicated as a primary cell during a handover procedure. One or multiple secondary cells may be configured at a point of time when or after a Radio Resource Control (RRC) connection is established. Note that the multiple configured serving cells may include one primary secondary cell (also referred to as a Primary SCell or a PSCell). The primary secondary cell may be a secondary cell that can transmit control information in the uplink out of one or multiple secondary cells in which the terminal apparatus 1 is configured. Further, for the terminal apparatus 1, a subset of two types of serving cells of a Master Cell Group (also referred to as an MCG) and a Secondary Cell Group (also referred to as an SCG) may be configured. The master cell group includes one primary cell and zero or more secondary cells. The secondary cell group includes one primary secondary cell and zero or more secondary cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described. Note that the downlink physical channels and/or the downlink physical signals may be collectively referred to as downlink signals. The uplink physical channels and/or the uplink physical signals may be collectively referred to as uplink signals. The downlink physical channels and/or the uplink physical channels may be collectively referred to as a physical channel. The downlink physical signals and/or the uplink physical signals may be collectively referred to as a physical signal.

In FIG. 1, in the downlink radio communication between the terminal apparatus 1 and the base station apparatus 3, the following downlink physical channels are used. The downlink physical channels are used for transmitting information output from the higher layer.

New Radio Physical Broadcast CHannel (NR-PBCH)
New Radio Physical Downlink Control CHannel (NR-PDCCH)
New Radio Physical Downlink Shared CHannel (NR-PDSCH)

The NR-PBCH (which may be referred to as a PBCH) is used for the base station apparatus 3 to broadcast an important information block (Master Information Block: MIB, Essential Information Block: EIB) including important system information (Essential information) required by the terminal apparatus 1. Here, one or more important information blocks may be transmitted as important information messages. For example, the important information block may include information indicating a part or all of a frame number (System Frame Number (SFN)) (for example, information related to a position in a super frame including multiple frames). For example, a radio frame (10 ms) includes 10 subframes each having 1 ms, and the radio frame is identified by the frame number. The frame number wraps around to 0 after reaching 1024. In addition, in a case that a different important information block is transmitted for each region within a cell, information for identifying the region (for example, the identifier information of a downlink transmission beam for configuring the region) may be included. Here, identifier information of a downlink transmission beam may be indicated using a downlink transmission beam (precoding) index. Furthermore, in a case that a different important information block (important information message) is transmitted for each region within the cell, information for identifying a time location within the frame (for example, a subframe number in which the important information block (important information message) is included) may be included. That is, information for determining each of the subframe numbers in which the respective important information blocks (important information messages) using different downlink transmission beam indices are transmitted may be included. For example, information necessary for connection to the cell and for mobility may be included in the important information.

In the NR-PDCCH (which may be referred to as a PDCCH) is used to transmit Downlink Control Information (DCI) in downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating a timing for transmitting HARQ-ACK with respect to a scheduled NR-PDSCH (for example, the number of symbols from the last symbol included in the NR-PDSCH to the symbol for transmission of the HARQ-ACK).

For example, the DCI may be defined to be used for the scheduling of a downlink radio communication NR-PDSCH in a cell (transmission of a downlink transport block).

For example, the DCI may be defined to be used for the scheduling of an uplink radio communication NR-PUSCH in a cell (transmission of an uplink transport block).

Here, the DCI includes information related to scheduling of the NR-PDSCH or the NR-PUSCH. Here, the DCI for the downlink is also referred to as downlink grant or downlink assignment. Here, the DCI for the uplink is also referred to as Uplink grant or uplink assignment.

The NR-PDSCH (which may be referred to as a PDSCH) is used to transmit downlink data (Downlink Shared CHannel (DL-SCH)) from medium access (Medium Access Control (MAC)). Furthermore, the NR-PDSCH is used to transmit System Information (SI), a Random Access Response (PAR), and the like.

Here, the base station apparatus 3 and the terminal apparatus 1 exchange (transmit and/or receive) signals with each other in higher layers. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and/or receive a Medium Access Control (MAC) control element in a Medium Access Control (MAC) layer. Here, the RRC signaling and/or the MAC control element is also referred to as higher layer signaling. The higher layer herein refers to higher layers from the perspective of the physical layer, and may thus include one or multiple MAC layers, RRC layers, RLC layers, PDCP layers, NAS layers, or the like. For example, the higher layer in processing of the MAC layer may include one or multiple RRC layers, RLC layers, PDCP layers, NAS layers, or the like.

The NR-PDSCH may be used to transmit RRC signaling and Medium Access Control Control Elements (MAC control elements (MAC CEs)). Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1.

In FIG. 1, the following downlink physical signals are used for downlink radio communication. Here, the downlink physical signals are not used to transmit information output from the higher layers but are used by the physical layer.

Synchronization signal (SS)
Reference Signal (RS)

The synchronization signal is used for the terminal apparatus 1 to establish synchronization in a frequency domain and a time domain in the downlink. The synchronization signal may include a Primary Synchronization Signal (PSS) and a Secondary Synchronization Signal (SSS). Further, the synchronization signal may be used for the terminal apparatus 1 to identify a Cell Identifier (cell ID). Further, the synchronization signal may be used to select/identify/determine a downlink transmission beam used by the base station apparatus 3 and/or a downlink reception beam used by the terminal apparatus 1 in downlink beamforming. In other words, the synchronization signal may be used to allow the terminal apparatus 1 to select/identify/determine the index of the downlink transmission beam applied to the downlink signal by the base station apparatus 3. Note that the synchronization signal, the primary synchronization signal, and the secondary synchronization signal used in NR may be referred to as an NR-SS, an NR-PSS, and an NR-SSS, respectively.

A downlink reference signal (hereinafter also simply referred to as a reference signal in the present embodiment) may be classified into multiple reference signals, based on its usage. For example, the following one or multiple reference signals may be used as the reference signal.

Demodulation Reference Signal (DMRS)
Channel State Information Reference Signal (CSI-RS)
Phrase Tracking Reference Signal (PTRS)
Mobility Reference Signal (MRS)

The DMRS may be used to perform channel compensation at the time of demodulating a receive modulation signal. Regarding the DMRS, a DMRS for NR-PDSCH demodulation, a DMRS for NR-PDCCH demodulation, and/or a DMRS for NR-PBCH demodulation may be collectively referred to as a DMRS, or each of those DMRSs may be defined individually.

The CSI-RS may be used to perform channel state measurement. The PTRS may be used to track phase according to movement of the terminal or the like. The MRS may be used to measure quality of reception from multiple base station apparatuses for handover.

Furthermore, the reference signal may be defined as a reference signal for compensating for phase noise.

Note that a function of at least a part of the above multiple reference signals may be included in another reference signal.

Further, at least one of the above multiple reference signals or the other reference signals may be defined as a Cell-specific reference signal (CRS) that is configured for each individual cell, a Beam-specific reference signal (BRS) for each transmission beam that is used by the base station apparatus 3 or the transmission reception point 4, and/or a terminal-specific reference signal (UE-specific reference signal (URS)) that is configured for each individual terminal apparatus 1.

Furthermore, at least one reference signal may be used for a numerology such as a radio parameter or subcarrier spacing, or used for Fine synchronization that allows FFT window synchronization or the like to be achieved.

At least one reference signal may also be used for Radio Resource Measurement (RRM). At least one reference signal may also be used for beam management.

Further, the synchronization signal may be used as at least one reference signal.

In FIG. 1, the following uplink physical channels are used in uplink radio communication between the terminal apparatus 1 and the base station apparatus 3 (radio communication from the terminal apparatus 1 to the base station apparatus 3). The uplink physical channels are used for transmitting information output from a higher layer.

New Radio Physical Uplink Control CHannel (NR-PUCCH)
New Radio Physical Uplink Shared CHannel (NR-PUSCH)
New Radio Physical Random Access CHannel (NR-PRACH)

The NR-PUCCH (which may be referred to as a PUCCH) is used to transmit Uplink Control Information (UCI). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Downlink-Shared CHannel (DL-SCH)).

The NR-PUSCH (which may be referred to as a PUSCH) is used to transmit uplink data (Uplink Shared CHannel (UL-SCH)) from medium access (Medium Access Control (MAC)). The NR-PUSCH may be used to transmit a HARQ-ACK and/or CSI along with the uplink data. Furthermore, the NR-PUSCH may be used to transmit the CSI only or the HARQ-ACK and CSI only. In other words, the NR-PUSCH may be used to transmit the UCI only.

The NR-PUSCH may be used to transmit the RRC signaling and the MAC control element. Here, the NR-PUSCH may be used to transmit UE Capabilities in the uplink.

Note that, for the NR-PDCCH and the NR-PUCCH, the same term (for example, an NR-PCCH) and the same channel definition may be used. For the NR-PDSCH and the NR-PUSCH, the same term (for example, an NR-PSCH) and the same channel definition may be used.

In FIG. 1, the following uplink physical signal is used in the uplink radio communication. Here, the uplink physical signal is not used to transmit information output from the higher layers but is used by the physical layer.

Uplink Reference Signal (UL RS)

According to the present embodiment, the following two types of uplink reference signals are used.

Demodulation Reference Signal (DMRS)
Sounding reference signal (SRS)

The base station apparatus 3 uses the DMRS in order to perform channel compensation of the NR-PUSCH or the NR-PUCCH. Transmission of both of the NR-PUSCH and the DMRS is hereinafter referred to simply as transmission of the NR-PUSCH. Transmission of both of the NR-PUCCH and the DMRS is hereinafter referred to simply as transmission of the NR-PUCCH.

For the base station apparatus 3, the NR-PRACH (which may be referred to as a PRACH) using an SRS for measuring an uplink channel state may be used to transmit a random access preamble. The NR-PRACH may be used for indicating the initial connection establishment procedure, the handover procedure, the connection re-establishment procedure, synchronization (timing adjustment) for uplink transmission, and a request for an NR-PUSCH (UL-SCH) resource.

The subframe will now be described. The subframe in the present embodiment may also be referred to as a resource unit, a radio frame, a time period, a time interval, or the like.

Figure 2:
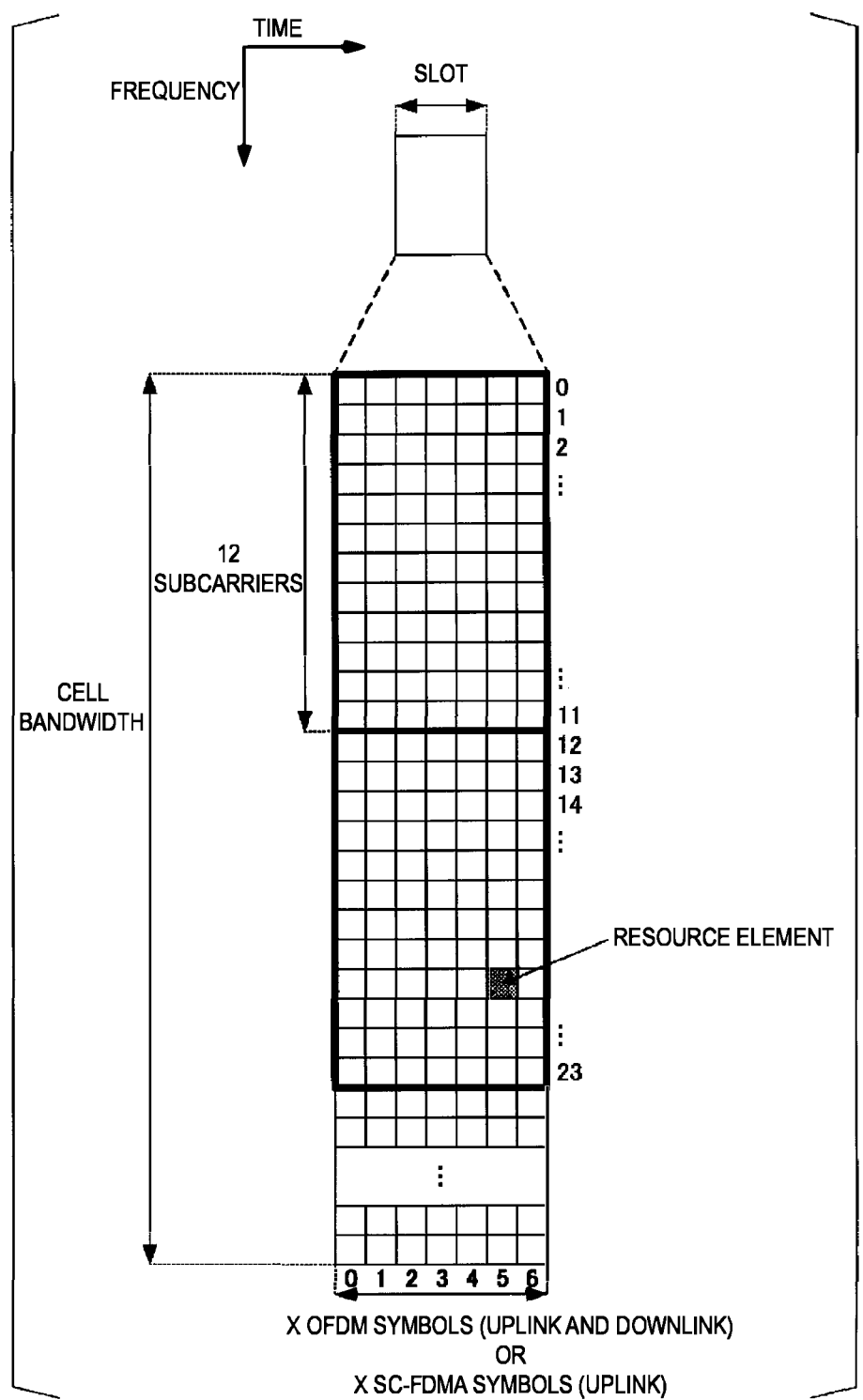
FIG. 2 is a diagram illustrating an example of a schematic configuration of a downlink slot according to an embodiment of the present invention.

FIG. 2 is a diagram illustrating a schematic configuration of a downlink slot according to an embodiment of the present invention. Each of the radio frames is 10 ms in length. Furthermore, each of the radio frames includes 10 subframes and X slots. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 and X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. FIG. 2 illustrates a case of X=7 as an example. Note that a case of X=14 can be similarly configured by expanding the case of X=7. Furthermore, the uplink slot is defined similarly, and the downlink slot and the uplink slot may be defined separately.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element within the resource grid is referred to as a resource element. The resource element may be identified by using a subcarrier number and an OFDM symbol number.

A resource block is used to represent mapping of a certain physical downlink channel (such as the PDSCH) or a certain physical uplink channel (such as the PUSCH) to resource elements. As the resource block, a virtual resource block and a physical resource block are defined. A certain physical uplink channel is first mapped to a virtual resource block. Thereafter, the virtual resource block is mapped to a physical resource block. In a case that the number X of OFDM symbols included in a slot is 7 and NCPs are used, one physical resource block is defined by 7 continuous OFDM symbols in the time domain and by 12 continuous subcarriers in the frequency domain. Hence, one physical resource block includes (7×12) resource elements. In a case of Extended CPs (ECPs), one physical resource block is defined, for example, by 6 continuous OFDM symbols in the time domain and by 12 continuous subcarriers in the frequency domain. Hence, one physical resource block includes (6×12) resource elements. In this case, one physical resource block corresponds to one slot in the time domain and corresponds to 180 kHz in the frequency domain. Physical resource blocks are numbered from 0 in the frequency domain.

Figure 3:
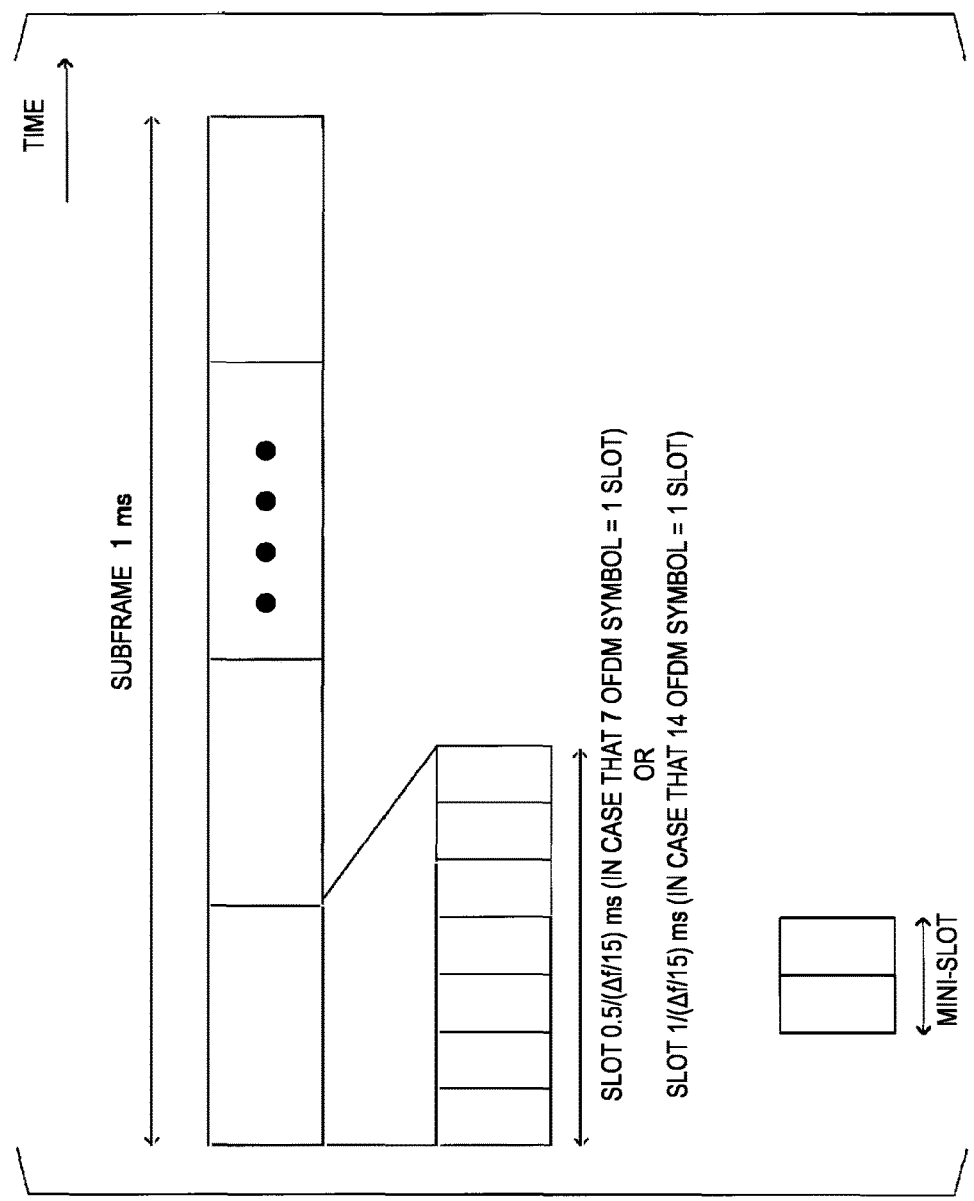
FIG. 3 is a diagram illustrating a relationship between a subframe, a slot, and a mini-slot in a time domain according to an embodiment of the present invention.

The subframe, the slot, and a mini-slot will now be described. FIG. 3 is a diagram illustrating the relationship between the subframe, the slot, and the mini-slot in the time domain. As illustrated in FIG. 3, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. Thus, with the assumption that the subcarrier spacing is 4f (kHz), the slot length may be defined as $0.5/(\Delta f/15)$ ms in a case that the number of OFDM symbols constituting one slot is 7. Here, $\Delta f$ may be defined by subcarrier spacing (kHz). In addition, in a case that the number of OFDM symbols constituting one slot is 7, the slot length may be defined as $1/(\Delta f/15)$ ms. Here, $\Delta f$ may be defined by subcarrier spacing (kHz). Furthermore, the slot length may be defined as $X/14/(\Delta f/15)$ ms, where X is the number of OFDM symbols included in the slot.

The mini-slot (which may be referred to as a sub-slot) is a time unit including OFDM symbols that are less in number than the OFDM symbols included in the slot. FIG. 3 illustrates, by way of example, a case that the mini-slot includes 2 OFDM symbols. The OFDM symbols in the mini-slot may match the timing for the OFDM symbols constituting the slot. Note that the smallest unit of scheduling may be a slot or a mini-slot.

Figure 4:
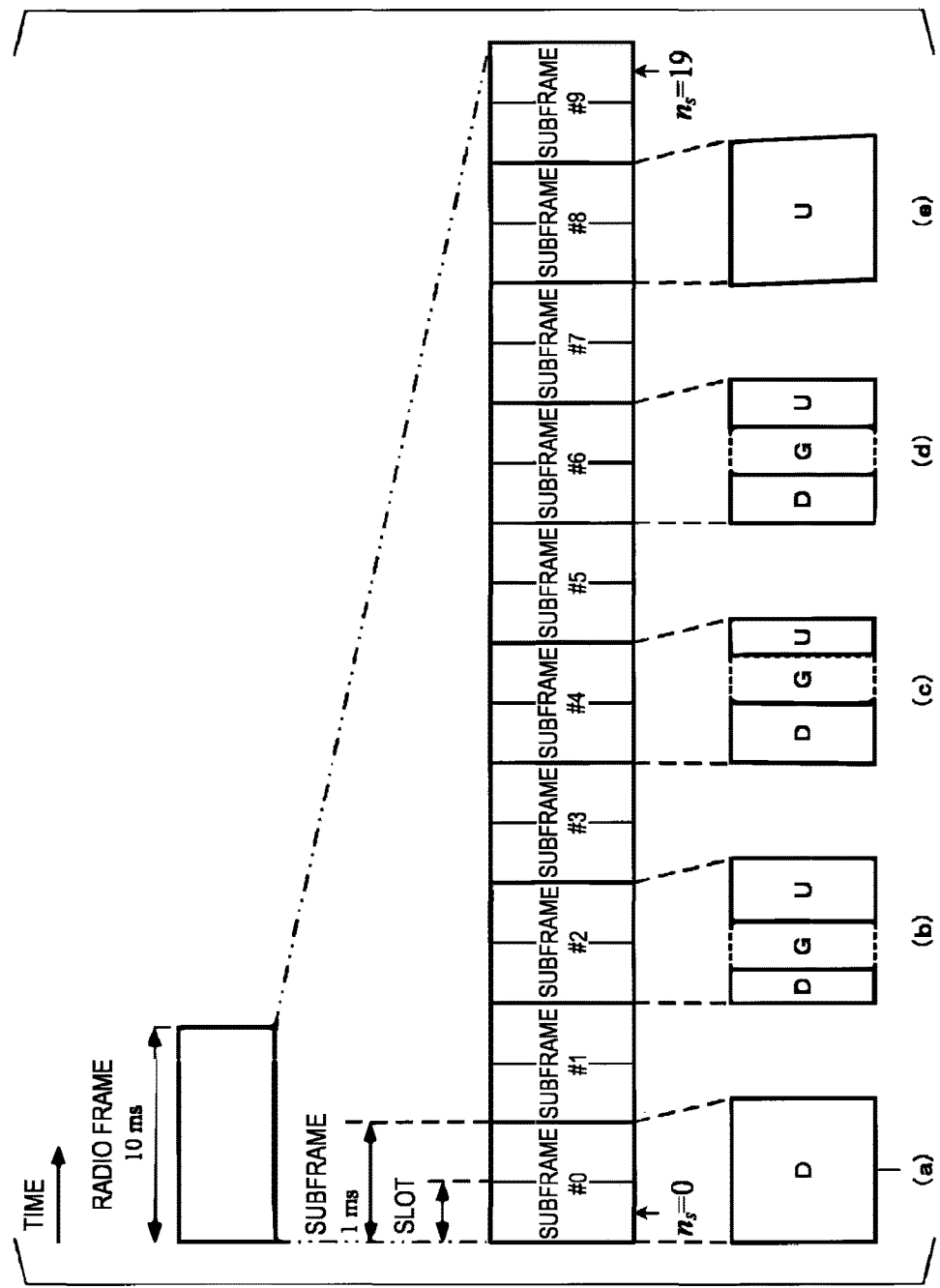
FIG. 4 is a diagram illustrating examples of a slot or a subframe according to an embodiment of the present invention.

FIG. 4 illustrates examples of a slot or a subframe. Here, a case that the slot length is 0.5 ms at a subcarrier spacing of 15 kHz is illustrated as an example. In FIG. 4, D represents the downlink, and U represents the uplink. As illustrated in FIG. 4, during a certain time interval (for example, the minimum time interval to be allocated to one UE in the system), the subframe may include at least one of the following:
downlink part (duration),
gap, or
uplink part (duration).

FIG. 4(a) illustrates an example in which the entire subframe is used for downlink transmission during a certain time interval (which may be referred to as, for example, a minimum unit of a time resource that can be allocated to one UE, a time unit, or the like; furthermore, multiple minimum units of time resources that are bundled may be referred to as a time unit). In FIG. 4(b), an uplink is scheduled via the NR-PDCCH, for example, by using the first time resource, and an uplink signal is transmitted after a gap for a processing delay of the NR-PDCCH, time for switching from a downlink to an uplink, and generation of a transmit signal. FIG. 4(c) illustrates a subframe used to transmit a downlink NR-PDCCH and/or a downlink NR-PDSCH by using the first time resource, and is used to transmit the NR-PUSCH or the NR-PUCCH after a gap for a processing delay, time for switching from a downlink to an uplink, and generation of a transmit signal. Here, for example, the uplink signal may be used to transmit the HARQ-ACK and/or CSI, namely, the UCI. FIG. 4(d) illustrates a subframe used to transmit the NR-PDCCH and/or the NR-PDSCH by using the first time resource, is used to transmit the NR-PUSCH and/or the NR-PUCCH after a gap for a processing delay, time for switching from a downlink to an uplink, and generation of a transmit signal. Here, for example, the uplink signal may be used to transmit the uplink data, namely, the UL-SCH. FIG. 4(e) illustrates an example in which the entire subframe is used for uplink transmission (the NR-PUSCH or the NR-PUCCH).

The above-described downlink part and uplink part may include multiple OFDM symbols as is the case with LTE.

Beamforming, beam management, and/or beam sweeping according to the embodiment of the present invention will be now described.

Beamforming of the transmitter (which is the base station apparatus 3 in a case of the downlink and the terminal apparatus 1 in a case of the uplink) is a method of controlling, in an analogue or digital manner, the amplitude/phase of a signal for each of multiple transmit antenna elements to transmit the signal with a high transmit antenna gain in a selected direction, and a field pattern thereof is referred to as transmission beam. Further, beamforming of the receiver (which is the terminal apparatus 1 in a case of the downlink and the base station apparatus 3 in a case of the uplink) is a method of controlling, in an analogue or digital manner, the amplitude/phase of a signal for each of multiple receive antenna elements to receive the signal with a high receive antenna gain in a selected direction, and a field pattern thereof is referred to as reception beam. Beam management may be an operation performed by the base station apparatus 3 and/or the terminal apparatus 1 to match directivity of a transmission beam and/or a reception beam and attain a beam gain.

Figure 5:
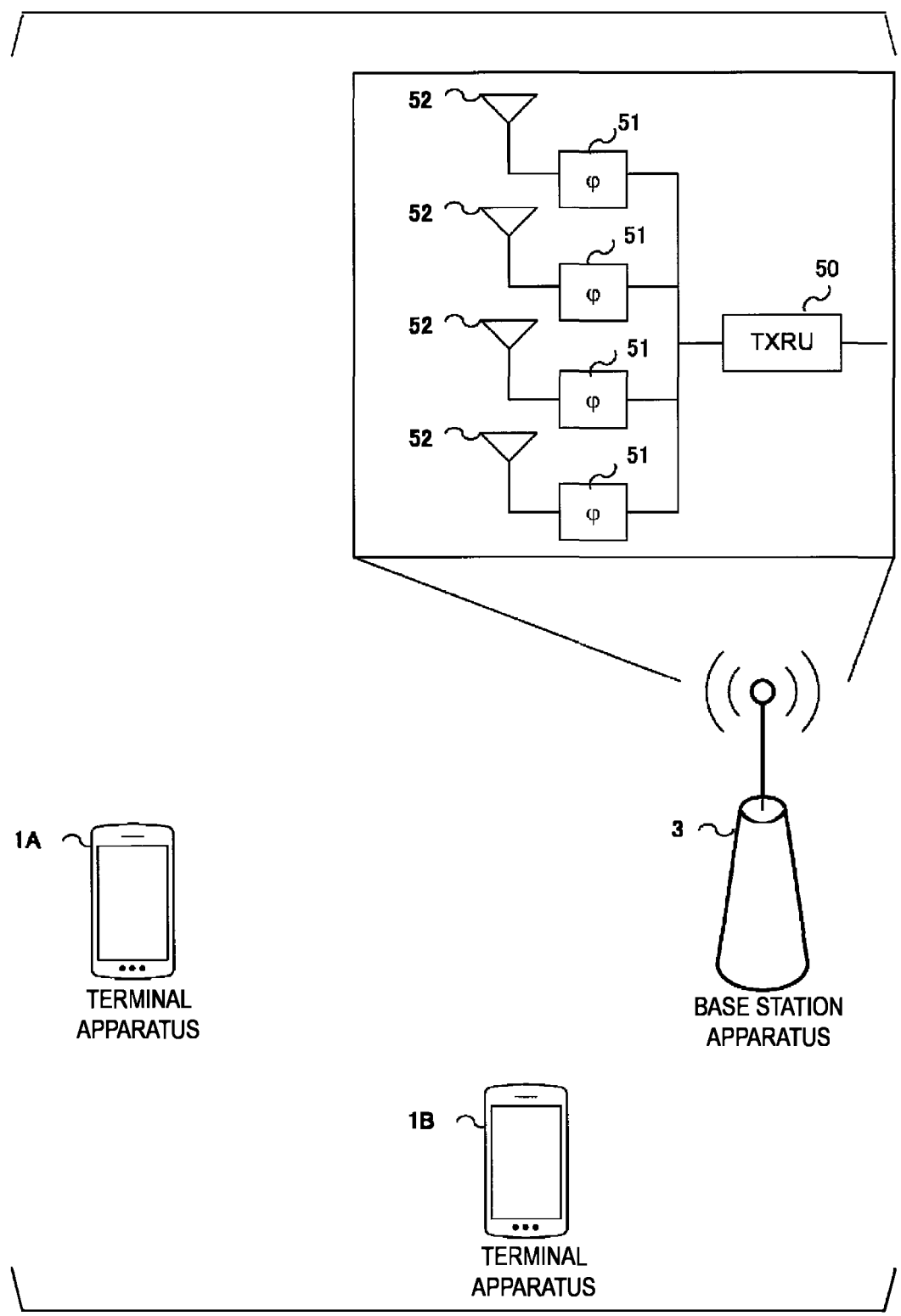
FIG. 5 is a diagram illustrating an example of beamforming according to an embodiment of the present invention.

FIG. 5 illustrates an example of beamforming. Multiple antenna elements are connected to one Transceiver unit (TXRU) 50. The phase is controlled by using a phase shifter 51 for each antenna element and a transmission is performed from an antenna element 52, thus allowing a beam for a transmit signal to be directed in any direction. Typically, the TXRU 50 may be defined as an antenna port, and only the antenna port may be defined for the terminal apparatus 1. Controlling the phase shifter 51 allows setting of directivity in any direction. Thus, the base station apparatus 3 can communicate with the terminal apparatus 1 by using a high gain beam.

The beamforming may be referred to as virtualization, precoding, and multiplication with a weight, for example. Further, a signal itself transmitted using beamforming may be simply referred to as a transmission beam.

In the present embodiment, a transmission beam used by the terminal apparatus 1 in beamforming of uplink transmission is referred to as an uplink transmission beam (UL Tx beam), and a reception beam used by the base station apparatus 3 in beamforming of uplink reception is referred to as an uplink reception beam (UL Rx beam). Note that the uplink transmission beam may be referred to as a transmission spatial filter configuration in the terminal apparatus 1, and the uplink reception beam may be referred to as a reception spatial filter configuration in the base station apparatus 3. Further, a transmission beam used by the base station apparatus 3 in beamforming of downlink transmission is referred to as a downlink transmission beam (DL Tx beam), and a reception beam used by the terminal apparatus 1 in beamforming of downlink reception is referred to as a downlink reception beam (DL Rx beam). Note that the downlink transmission beam may be referred to as a transmission spatial filter configuration in the base station apparatus 3, and the downlink reception beam may be referred to as a reception spatial filter configuration in the terminal apparatus 1. Note that the uplink transmission beam and the uplink reception beam may be collectively referred to as an uplink beam, and the downlink transmission beam and the downlink reception beam may be collectively referred to as a downlink beam. Note that processing performed by the terminal apparatus 1 for uplink beamforming may be referred to as uplink transmission beam processing or uplink precoding, and processing performed by the base station apparatus 3 for uplink beamforming may be referred to as uplink reception beam processing. Note that processing performed by the terminal apparatus 1 for downlink beamforming may be referred to as downlink reception beam processing, and processing performed by the base station apparatus 3 for downlink beamforming may be referred to as downlink transmission beam processing or downlink precoding.

Note that the base station apparatus 3 may transmit a signal by using multiple downlink transmission beams in one OFDM symbol. For example, the antenna element of the base station apparatus 3 may be divided into subarrays to perform downlink beamforming differently for each of the subarrays. Downlink beamforming may be performed differently for each polarization by using a polarization antenna. In a similar manner, the terminal apparatus 1 may transmit a signal by using multiple uplink transmission beams in one OFDM symbol.

Note that the present embodiment illustrates a case that the base station apparatus 3 switchably uses multiple downlink transmission beams in a cell configured by the base station apparatus 3 and/or the transmission reception point 4. However, an individual cell may be configured for each downlink transmission beam.

Beam management according to the present embodiment may include the following operations.

Beam selection
Beam refinement
Beam recovery

For example, the beam selection may be an operation for selecting a beam in communication between the base station apparatus 3 and the terminal apparatus 1. Furthermore, the beam refinement may be an operation for selecting a beam having a higher gain or changing a beam to an optimum beam between the base station apparatus 3 and the terminal apparatus 1 according to the movement of the terminal apparatus 1. The beam recovery may be an operation for re-selecting the beam in a case that the quality of a communication link is degraded due to blockage caused by a blocking object, a passing human being, or the like in communication between the base station apparatus 3 and the terminal apparatus 1. The purposes of the above operations are not limited to the above purposes. The base station apparatus 3 performs beam management in various situations, and the effects may thus be fulfilled without limiting the purposes.

For example, the reference signal (for example, the CSI-RS) or Quasi Co-Location (QCL) assumption may be used for the terminal apparatus 1 to select the transmission beam for the base station apparatus 3.

In a case that a Long Term Property of a channel on which one symbol in one antenna port is carried may be estimated from a channel on which one symbol in the other antenna port is carried, the two antenna ports are said to be QCL. The long term property of the channel includes at least one of a delay spread, a Doppler spread, a Doppler shift, an average gain, or an average delay. For example, in a case that antenna port 1 and antenna port 2 are QCL with respect to the average delay, this means that a reception timing for antenna port 2 may be estimated from a reception timing for antenna port 1.

The QCL may also be expanded to beam management. For this purpose, spatially expanded QCL may be newly defined. For example, as a Long term property of a channel in spatial QCL assumption, the following one or multiple items may further be included in addition to the above.

An Angle of Arrival ((AoA), a Zenith angle of Arrival (ZoA) or the like) and/or an Angle Spread (for example, Angle Spread of Arrival (ASA) or a Zenith angle Spread of Arrival (ZSA)) in a radio link or a channel A transmission angle (AoD, ZoD, or the like) and/or an angle spread of the transmission angle (for example, an Angle Spread of Departure (ASD) or a Zenith angle Spread of Departure (ZSS)) in a radio link or a channel Spatial Correlation According to this method, operation of the base station apparatus 3 and the terminal apparatus 1 equivalent to beam management may be defined as beam management based on the spatial QCL assumption and radio resources (time and/or frequency).

Note that an antenna port may be assigned to each of the precoding processings or each of the transmission beams. For example, a signal to be transmitted by using a different precoding processing or a signal to be transmitted by using a different transmission beam according to the present embodiment may be defined as a signal to be transmitted through one or multiple different antenna ports. However, the antenna port is defined as an antenna port that allows a channel on which a certain symbol is transmitted through a certain antenna port to be inferred from a channel on which another symbol is transmitted through the same antenna port. The same antenna port also means that the antenna port number (the number for identifying an antenna port) may be the same. An antenna port set may be constituted by multiple antenna ports. The same antenna port set also means that the antenna port set number (the number for identifying an antenna port set) may be the same. A signal to be transmitted by applying a different uplink transmission beam also means that the signal may be transmitted through a different antenna port or a different antenna port set constituted by multiple antenna ports. A beam index may be an OFDM symbol number, an antenna port number, or an antenna port set number.

A complex modulation symbol for one or more layers generated by layer mapping is input into transform precoding. The transform precoding may be processing for dividing a block of complex-valued symbols into sets for each layer corresponding to one OFDM symbol. In a case that OFDM is used, processing of Discrete Fourier Transform (DFT) in transform precoding may not be necessary.

In the precoding, the block of vectors obtained from a transform precoder may be input to generate a block of vectors to be mapped to a resource element. In a case of spatial multiplexing, one of precoding matrices may be adapted in generating the block of vectors to be mapped to a resource element. This processing may be referred to as digital beamforming. Further, the precoding may be defined to include analog beamforming and digital beamforming, or may be defined as digital beamforming. The beamforming may be applied to a precoded signal, and the precoding may be applied to a signal to which the beamforming is applied.

The beamforming may include digital beamforming and may not include analog beamforming, or may include both digital beamforming and analog beamforming. A beamformed signal, a precoded signal, or a beamformed and precoded signal may be referred to as a beam. A beam index may be a precoding matrix index. The beam index and the precoding matrix index may be defined independently. The precoding matrix indicated by the precoding matrix index may be applied to the beam indicated by the beam index to generate a signal. The beamforming indicated by the beam index may be applied to the signal to which the precoding matrix indicated by the precoding matrix index is applied, to generate a signal. The digital beamforming may include adaptation of a different precoding matrix to a resource in a frequency direction (for example, a set of subcarriers).

Note that, in the present embodiment, a radio link configured using a prescribed transmission beam and/or a prescribed reception beam may be referred to as a beam pair link. For example, in the downlink, a beam pair link configured using a different downlink transmission beam and/or a different downlink reception beam may be a different downlink beam pair link. For example, in the uplink, a beam pair link configured using a different uplink transmission beam and/or a different uplink reception beam may be a different uplink beam pair link. For example, a state in which the terminal apparatus 1 may receive a downlink signal by using multiple downlink transmission beams and/or multiple downlink reception beams in a certain cell may be referred to as a state including multiple downlink beam pair links. For example, a state in which the terminal apparatus 1 may transmit an uplink signal by using multiple uplink transmission beams and/or multiple uplink reception beams in a certain cell may be referred to as a state including multiple uplink beam pair links. The downlink beam pair link may be referred to as one or multiple downlink physical signals or one or multiple downlink physical channels associated with one or multiple downlink reference signals based on information received from the base station apparatus. This association may be performed by QCL configuration. The QCL configuration may include information for configuring association between one or multiple downlink reference signals identified by a transmission configuration indicator (TCI) and one or multiple PDSCH DMRS ports. The QCL configuration may include information for associating the TCI and a COntrol REsource SET (CORESET). The terminal apparatus 1 may associate the downlink reception beam with the downlink beam pair link. The uplink beam pair link may be referred to as one or multiple uplink physical signals or one or multiple uplink physical channels associated with one or multiple uplink reference signals (SRSs or the like) based on information received from the base station apparatus. The base station apparatus 3 may associate the uplink reception beam with the uplink beam pair link.

Figure 6:
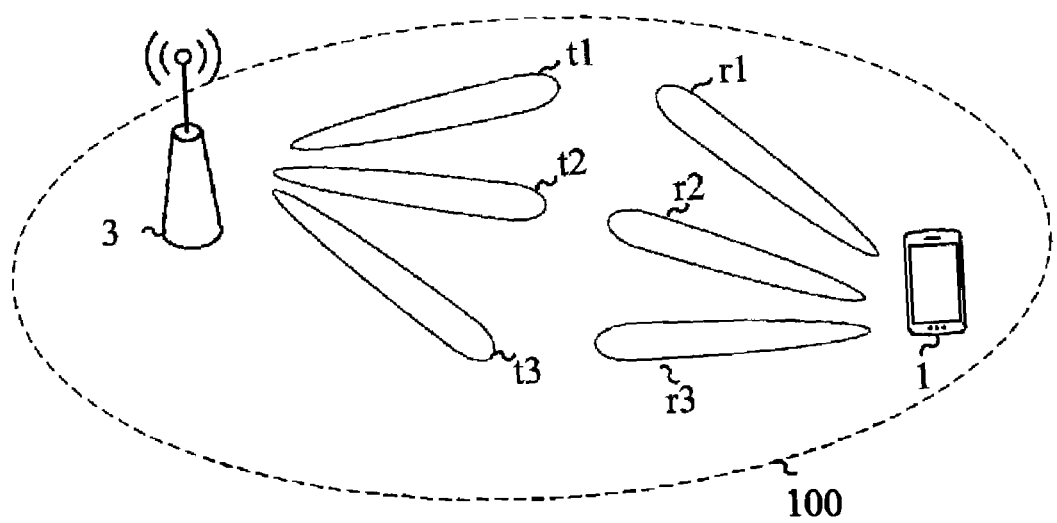
FIG. 6 is a diagram illustrating a concept in which multiple reference signals to which transmission beams are applied are transmitted in one or multiple cells according to an embodiment of the present invention.

FIG. 6 illustrates a case that the terminal apparatus 1 and the base station apparatus 3 configure multiple downlink beam pair links in a cell 100. As the first downlink beam pair link, the terminal apparatus 1 uses a downlink reception beam r1 to receive a downlink signal that is transmitted from the base station apparatus 3 using a downlink transmission beam t1. As the second downlink beam pair link, the terminal apparatus 1 uses a downlink reception beam r2 to receive a downlink signal that is transmitted from the base station apparatus 3 using a downlink transmission beam t2. As the third downlink beam pair link, the terminal apparatus 1 uses a downlink reception beam r3 to receive a downlink signal that is transmitted from the base station apparatus 3 using a downlink transmission beam t3. In this case, three downlink beam pair links are configured between the terminal apparatus 1 and the base station apparatus 3, and downlink transmission and/or reception is performed in all or a part of the three downlink beam pair links. For example, the terminal apparatus 1 measures received power and/or received quality by using the reference signal in each of the downlink beam pair links.

Note that, for one downlink transmission beam, multiple downlink beam pair links may be configured by using multiple downlink reception beams. Note that, for one downlink reception beam, multiple downlink beam pair links may be configured by using multiple downlink transmission beams. Note that one downlink transmission beam may be associated with one downlink beam pair link, irrespective of a downlink reception beam to be used. Note that one uplink reception beam may be associated with one uplink beam pair link, irrespective of an uplink transmission beam to be used.

Figure 7:
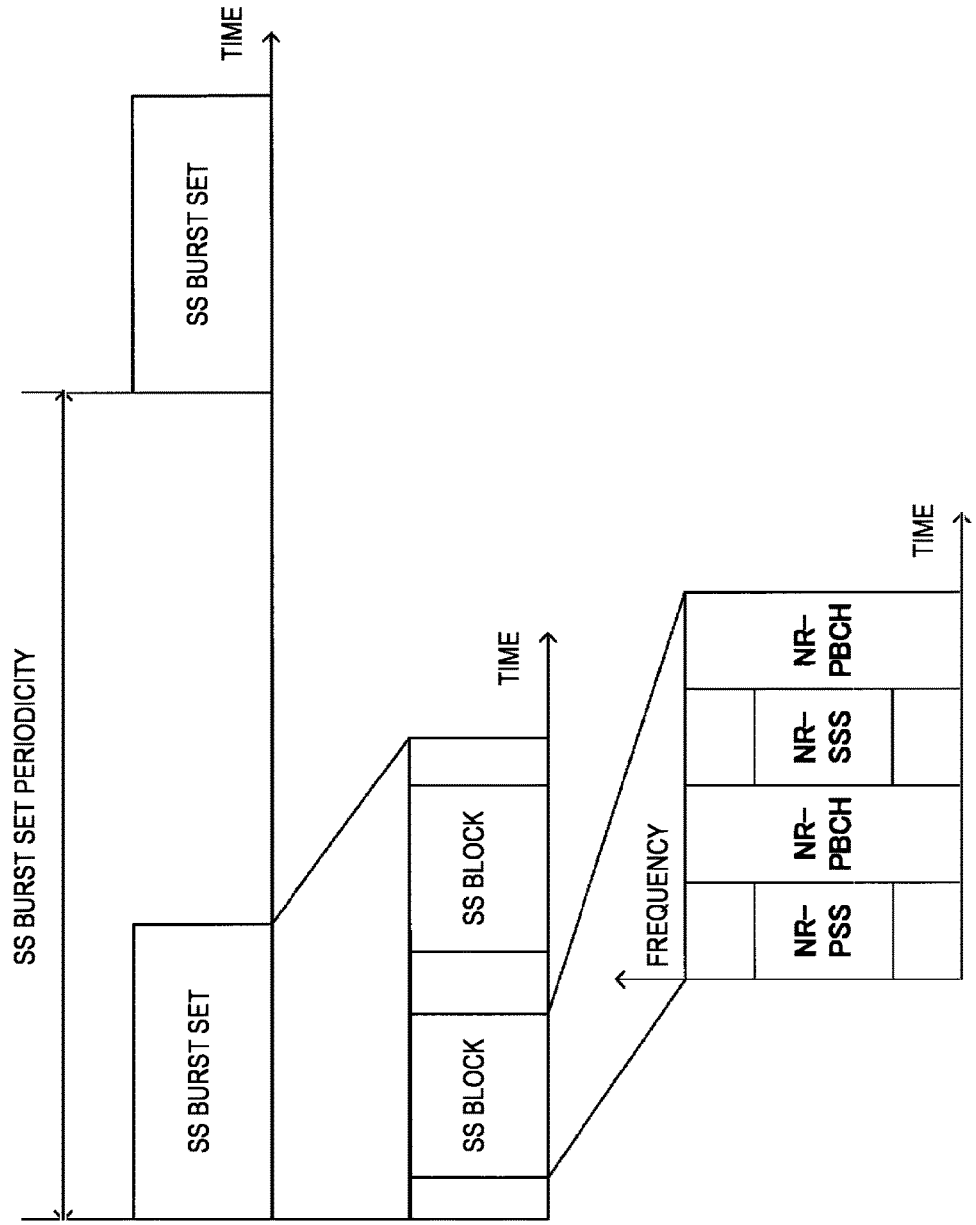
FIG. 7 is a diagram illustrating an example of an SS block and an SS burst set according to the present embodiment according to an embodiment of the present invention.

FIG. 7 is a diagram illustrating an example of a Synchronization Signal (SS) block (also referred to as a synchronization signal/physical broadcast channel block (SS/PBCH block)) and a synchronization signal burst set (also referred to as an SS burst set) according to the present embodiment. FIG. 7 illustrates an example in which two SS blocks are included in each SS burst set that is periodically transmitted, and each SS block includes four OFDM symbols.

The SS block is a unit block including synchronization signals (for example, an NR-PSS and an NR-SSS) and/or an NR-PBCH. In a case that the base station apparatus 3 transmits the synchronization signal and/or the NR-PBCH by using one or multiple SS blocks in the SS burst set, the base station apparatus 3 may use an independent downlink transmission beam for each SS block.

FIG. 7 illustrates an example in which the NR-PSS, the NR-SSS, and the NR-PBCH are multiplexed on one SS block in the time domain, and two symbols of the NR-PBCH, each of which is transmitted in a bandwidth broader than a bandwidth for the NR-PSS and/or the NR-SSS, are multiplexed in the time domain. Note that the order in which the NR-PSS, the NR-SSS, and/or the NR-PBCH are multiplexed in the time domain may be different from that in the example illustrated in FIG. 7. For example, in a case that the NR-PBCH is transmitted on two symbols, an OFDM symbol for transmitting the NR-SSS may be present between the two NR-PBCH symbols. Note that a part of the NR-PBCH may be multiplexed on the same symbol as the NR-SSS in the frequency domain.

The SS burst set may be periodically transmitted. For example, a period used for initial access and a period configured for a connected (Connected or RRC_Connected) terminal apparatus may be defined. Furthermore, the period configured for the connected (Connected or RRC_Connected) terminal apparatus may be configured in the RRC layer. Additionally, the period configured for the connected (Connected or RRC_Connected) terminal may be a period of a radio resource in the time domain during which transmission is potentially to be performed, and in practice, whether the transmission is to be performed during the period may be determined by the base station apparatus 3. Furthermore, the period used for the initial access may be predefined in specifications or the like.

The SS burst set may be determined based on a System Frame Number (SFN). Furthermore, a starting position of the SS burst set (boundary) may be determined based on the SFN and the period.

The SS block is assigned an index (also referred to as an SS block index) depending on a temporal position in the SS burst set. The terminal apparatus 1 calculates an index, based on information of the NR-PBCH and/or information of the reference signal included in the detected SS block.

SS blocks at the same relative time in each SS burst set of multiple SS burst sets are assigned the same SS block index. It may be assumed that the same downlink transmission beam is applied to SS blocks at the same relative time in each SS burst set of multiple SS burst sets. Further, it may be assumed that antenna ports for SS blocks at the same relative time in each SS burst set of multiple SS burst sets are QCL with respect to average delay, a Doppler shift, and spatial correlation.

It may be assumed that SS blocks that are assigned the same index in a certain SS burst set period are QCL with respect to average delay, an average gain, Doppler spread, a Doppler shift, and spatial correlation. Configuration corresponding to one or multiple QCL SS blocks (which may be reference signals) may be referred to as QCL configuration.

The number of SS blocks may be defined as the number of SS blocks in, for example, an SS burst, an SS burst set, or an SS block period. Further, the number of SS blocks may indicate the number of beam groups for cell selection in an SS burst, an SS burst set, or an SS block period. Here, the beam groups may be defined as the number of SS blocks or different beams included in an SS burst, an SS burst set, or an SS block period.

In the following, the reference signal described in the present embodiment includes a downlink reference signal, a synchronization signal, an SS block, a downlink DM-RS, a CSI-RS, an uplink reference signal, an SRS, and/or an uplink DM-RS. For example, the downlink reference signal, the synchronization signal, and/or the SS block may be referred to as the reference signal. The reference signal used in the downlink includes a downlink reference signal, a synchronization signal, an SS block, a downlink DM-RS, a CSI-RS, or the like. The reference signal used in the uplink includes an uplink reference signal, an SRS, an uplink DM-RS, and/or the like.

Notification of SRS resources according to the present embodiment will be described.

The base station apparatus 3 transmits an SRS Resource Indicator (SRI) to the terminal apparatus 1, and thereby notifies the terminal apparatus 1 of one or multiple resources used to transmit the SRS. One or multiple SRS resources are associated with at least one antenna port and/or one uplink transmission beam (which may be a transmission spatial filter configuration or a precoder of the terminal apparatus 1). The terminal apparatus 1 that has received information of the SRI may determine an antenna port and/or an uplink transmission beam to be used for uplink transmission, based on the SRI.

A Random Access procedure according to the present embodiment will be described.

The random access procedure is classified into two procedures: a Contention Based (CB) random access procedure and a non-Contention based random access procedure (which may be referred to as a Contention Free (CF) random access procedure).

The terminal apparatus 1 performs the contention based random access procedure at the time of initial access from a state in which the terminal apparatus 1 is not connected to (communicated with) the base station apparatus 3 and/or at the time of scheduling request in a case that transmittable uplink data or transmittable sidelink data is generated in the terminal apparatus 1 even though the terminal apparatus 1 is connected to the base station apparatus 3, for example. Note that the purpose of the random access is not limited to those described above.

A state in which transmittable uplink data is generated in the terminal apparatus 1 may include a state in which a buffer status report corresponding to transmittable uplink data is triggered. A state in which transmittable uplink data is generated in the terminal apparatus 1 may include a state in which a scheduling request triggered based on generation of transmittable uplink data is pended.

A state in which transmittable sidelink data is generated in the terminal apparatus 1 may include a state in which a buffer status report corresponding to transmittable sidelink data is triggered. A state in which transmittable sidelink data is generated in the terminal apparatus 1 may include a state in which a scheduling request triggered based generation of transmittable sidelink data is pended.

The non-contention based random access procedure may be a procedure for performing random access by using a preamble corresponding to a random access preamble index indicated by the base station apparatus 3, and is used for, for example, promptly establishing uplink synchronization between the terminal apparatus 1 and the base station apparatus 3 in a case that a handover and transmission timing of the mobile station apparatus are not effective even though the base station apparatus 3 and the terminal apparatus 1 are connected. Note that the purpose of the random access is not limited to those described above.

The terminal apparatus 1 may perform the non-contention based random access procedure in a case that the terminal apparatus 1 receives information indicating initiation of a random access procedure from the base station apparatus 3. Note that the information indicating initiation of a random access procedure may be referred to as message 0, Msg. 0, an NR-PDCCH order, a PDCCH order, or the like.

Note that, in a case that a random access preamble index indicated by message 0 has a prescribed value (for example, all the bits indicating the index are 0), the terminal apparatus 1 may perform the contention based random access procedure in which the terminal apparatus 1 randomly selects one preamble out of a set of available preambles and transmits the selected preamble.

The terminal apparatus 1 according to the present embodiment receives random access configuration information via the higher layer before initiation of the random access procedure. The random access configuration information may include the following pieces of information or information for determining/configuring the following pieces of information.

One or multiple sets of time-frequency resources available for transmission of random access preamble(s)

One or multiple random access preamble groups

One or multiple available random access preambles or one or multiple available random access preambles in the multiple random access preamble groups Window size and Contention Resolution timer (mac-ContentionResolutionTimer) for a random access response Power ramping step Maximum transmission number of times of preamble transmission Initial transmit power for a preamble Power offset based on a preamble format Maximum number of times of power ramping Note that a part of the pieces of random access configuration information may be associated with all of the SS blocks in the SS burst set. Note that a part of the pieces of random access configuration information may be associated with one or all of multiple configured CSI-RSs. Note that a part of the pieces of random access configuration information may be associated with one downlink transmission beam (or a beam index).

Note that a part of the pieces of random access configuration information may be associated with one SS block in the SS burst set. Note that a part of the pieces of random access configuration information may be associated with one or one of multiple configured CSI-RSs. Note that a part of the pieces of random access configuration information may be associated with one downlink transmission beam (or a beam index).

Note that a piece of random access configuration information may be configured for each SS block in the SS burst set, or one common piece of random access configuration information may be configured in all of the SS blocks in the same signal burst set. The terminal apparatus 1 may receive one or multiple pieces of random access configuration information through a downlink signal, and each of the one or multiple pieces of random access configuration information may be associated with an SS block (which may be a CSI-RS or a downlink transmission beam). The terminal apparatus 1 may select one or one of multiple received SS blocks (which may be CSI-RSs or downlink transmission beams), and may perform the random access procedure by using piece(s) of random access configuration information associated with the selected SS block.

FIG. 8 is a diagram illustrating an example of a configuration of the random access configuration information according to the present embodiment. In FIG. 8, the terminal apparatus 1 receives random access configuration information corresponding to the first SS block and random access configuration information corresponding to the second SS block. Each of the random access configuration information corresponding to the first SS block and the random access configuration information corresponding to the second SS block includes a preamble group and a set of time-frequency resources available for random access, and other information.

Note that FIG. 8 illustrates a case that the terminal apparatus 1 receives two pieces of random access configuration information corresponding to two respective SS blocks. However, the terminal apparatus 1 may receive three or more pieces of random access configuration information corresponding to three or more respective SS blocks.

Note that the example of FIG. 8 illustrates a case that the respective pieces of information included in the random access configuration information are present in each SS block. However, a part of the pieces of information included in the random access configuration information may be configured to be common to multiple SS blocks. For example, a part of the pieces of random access configuration information may be information that is configured for each SS block, CSI-RS, or downlink transmission beam (transmission filter configuration of the base station apparatus 3), and the other pieces of random access configuration information may be information that is configured for each cell.

One or a set of multiple time-frequency resources available for transmission of a random access preamble (each of such resources is hereinafter referred to as a random access channel (RACH) occasion (RACH occasion), or may be referred to as a physical random access channel occasion (PRACH occasion) or a random access channel transmission occasion (RACH transmission occasion)) may be configured for each reference signal (for example, SS block, CSI-RS, or downlink transmission beam). For example, each of one or multiple RACH occasions available for transmission of a random access preamble included in the random access configuration information may be a time-frequency resource for one random access preamble to be transmitted using a configured preamble format. For example, each of one or multiple RACH occasions available for transmission of a random access preamble included in the random access configuration information may be a time-frequency resource for one random access preamble to be transmitted using a configured preamble format by using one uplink transmission beam. The RACH occasion may be interpreted as one or multiple time resources available for transmission of a random access preamble. In such a case, in identification of the RACH occasion, only a time resource is identified. Thus, identification of a frequency resource to be used for transmission of a random access preamble is further performed. The terminal apparatus 1 may select one or a set of multiple RACH occasions available for transmission of a random access preamble, based on a received reference signal (for example, an SS block, a CSI-RS, or a downlink transmission beam). Note that the RACH occasion may be associated with a configuration index that is notified through the random access configuration information. Note that one or a set of multiple RACH occasions may be referred to as a random access channel resource (RACH resource).

For example, each of one or multiple random access preamble groups included in the random access configuration information may be associated with each reference signal (for example, SS block, CSI-RS, or downlink transmission beam). The terminal apparatus 1 may select a random access preamble group, based on a received reference signal (for example, an SS block, a CSI-RS, or a downlink transmission beam).

Note that the random access preamble group associated with each SS block may be identified by one or multiple parameters that are notified from the higher layer. The one or one of the multiple parameters may be the number of preambles available for the contention based random access per SS block. The one or one of the multiple parameters may be the sum of the number of preambles available for the contention based random access per SS block and the number of preambles available for the non-contention based random access. The one or one of the multiple parameters may be the number of SS blocks associated with one RACH occasion.

Note that the example of FIG. 8 illustrates a case that one piece of random access configuration information is associated with one SS block. However, the one piece of random access configuration information may be associated with one index (for example, one SS block index, one CSI-RS index, one downlink transmission beam index, or the like).

Note that the terminal apparatus 1 may receive one or multiple downlink signals each transmitted using one downlink transmission beam, receive random access configuration information associated with one downlink signal out of the one or multiple downlink signals, and perform the random access procedure, based on the received random access configuration information. The terminal apparatus 1 may receive one or multiple SS blocks in the SS burst set, receive random access configuration information associated with one SS block out of the one or multiple SS blocks, and perform the random access procedure, based on the received random access configuration information. The terminal apparatus 1 may receive one or multiple CSI-RSs, receive random access configuration information associated with one CSI-RS out of the one or multiple CSI-RSs, and perform the random access procedure, based on the received random access configuration information.

One or multiple pieces of random access configuration information may include one random access channel configuration (RACH-Config) and/or one physical random access channel configuration (PRACH-Config).

The random access channel configuration may include parameters related to random access of each reference signal.

The physical random access channel configuration may include parameters (an index of PRACH configuration, a RACH occasion, or the like) related to the physical random access channel of each reference signal.

One piece of random access configuration information may indicate parameters related to a random access corresponding to one reference signal, and multiple pieces of random access configuration information may indicate parameters related to multiple random accesses corresponding to multiple reference signals.

One piece of random access configuration information may indicate a parameter related to a physical random access corresponding to one reference signal, or may indicate parameters related to multiple random accesses corresponding to multiple reference signals.

In a case that a corresponding reference signal is selected, random access configuration information corresponding to the reference signal (a random access channel configuration corresponding to the reference signal, or a physical random access channel configuration corresponding to the reference signal) may be selected.

Note that the terminal apparatus 1 may receive one or multiple pieces of random access configuration information from a base station apparatus 3 and/or a transmission reception point 4 that is different from a base station apparatus 3 and/or a transmission reception point 4 that transmits a random access preamble. For example, the terminal apparatus 1 may transmit a random access preamble to a second base station apparatus 3, based on at least one piece of random access configuration information received from a first base station apparatus 3.

Note that the base station apparatus 3 may determine a downlink transmission beam to be applied in a case of transmitting a downlink signal to the terminal apparatus 1, based on reception of a random access preamble that is transmitted by the terminal apparatus 1. The terminal apparatus 1 may transmit a random access preamble by using a RACH occasion that is indicated by random access configuration information associated with a certain downlink transmission beam. The base station apparatus 3 may determine a downlink transmission beam to be applied in a case of transmitting a downlink signal to the terminal apparatus 1, based on a random access preamble received from the terminal apparatus 1 and/or a RACH occasion in which the random access preamble is received.

A selection rule of a case that the terminal apparatus 1 according to the present embodiment receives multiple pieces of random access configuration information and selects one piece of random access configuration information to be used for the random access procedure from the multiple pieces of random access configuration information will be described.

The terminal apparatus 1 may select random access configuration information to be used for the random access procedure, based on channel characteristics between the terminal apparatus 1 and the base station apparatus 3. The terminal apparatus 1 may select random access configuration information to be used for the random access procedure, based on channel characteristics measured based on a reference signal (for example, an SS block and/or a CSI-RS) received from the base station apparatus 3.

The terminal apparatus 1 may randomly select one piece of random access configuration information from multiple received pieces of random access configuration information.

The terminal apparatus 1 may select one piece of random access configuration information from multiple received pieces of random access configuration information, based on a downlink signal received from the base station apparatus 3. Note that the downlink signal may be a downlink signal received from a base station apparatus 3 as a transmission destination of a random access preamble, or may be a downlink signal received from a different base station apparatus 3. For example, random access configuration information selected based on a downlink signal transmitted from a first base station apparatus 3 that forms a first cell may be used for the random access procedure with a second base station apparatus 3 that forms a second cell.

As one or multiple available RACH occasions included in the random access configuration information, a subcarrier index, a resource block index, a subframe number, a system frame number, a symbol number, and/or a preamble format, which can each be used to transmit a random access preamble, may be configured.

Figure 9:
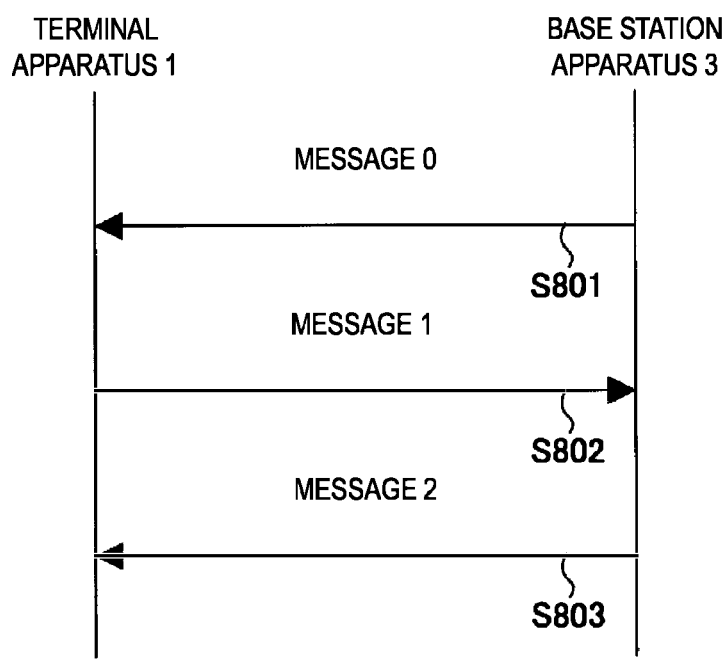
FIG. 9 is a conceptual diagram of transmission and/or reception of multiple messages between a terminal apparatus 1 and a base station apparatus 3 during a random access procedure according to an embodiment of the present invention.

The random access procedure in a case that the terminal apparatus 1 receives message 0 from the base station apparatus 3 is, as illustrated in FIG. 9, implemented through transmission and/or reception of multiple messages between the terminal apparatus 1 and the base station apparatus 3.

Message 0 (S801)

The base station apparatus 3 assigns one or multiple non-contention random access preambles to the terminal apparatus 1 through downlink dedicated signalling. Note that the non-contention random access preambles may be random access preambles not included in a set that is notified through broadcast signaling. In a case that the base station apparatus 3 transmits multiple reference signals, the base station apparatus 3 may assign multiple non-contention random access preambles corresponding to respective ones of at least a part of the multiple reference signals.

The downlink dedicated signaling used for assigning the non-contention random access preambles is referred to as message 0 or Msg 0. Message 0 may be a handover (HO) command that is generated by a target base station apparatus 3 and is transmitted by a source base station apparatus 3 for the sake of handover. Message 0 may be a PDCCH order. Message 0 may be transmitted on the RRC signaling and/or the PDCCH.

Information indicated by message 0 may include preamble index information, mask index information, SRS Resource Indicator (SRI) information, SS block re-selection indication information (SS block Re-selection Indicator), random access configuration re-selection indication information (Random Access Configuration Re-selection Indicator), CSI-RS selection indication information, RS type selection indication information, and/or a TCI.

The preamble index information is information indicating one or multiple preamble indices used to generate a random access preamble. Note that, in a case that the preamble index information has a prescribed value, the terminal apparatus 1 may randomly select one from one or multiple available random access preambles.

The mask index information is information indicating an index of a time-frequency resource available for transmission of a random access preamble. Note that the time resource and/or frequency resource indicated by the mask index information may be one specific resource, may indicate multiple selectable resources, or different indices may separately indicate one specific resource and multiple selectable resources.

Note that the preamble index information and the mask index information may be indicated as one piece of index information. For example, one index may indicate all or a part of preambles (which may be referred to as sequences or codes), time resources, and frequency resources available for the terminal apparatus 1 to transmit a random access preamble.

Note that, in the preamble index information and/or the mask index information, different values may be configured for each SS block. For example, the terminal apparatus 1 may select one out of one or multiple received SS blocks, and transmit a random access preamble by using preamble index information and/or mask index information associated with the selected SS block.

Note that, in the preamble index information and/or the mask index information, a common value for multiple SS blocks may be configured. For example, the terminal apparatus 1 may select one out of one or multiple received SS blocks, select random access configuration associated with the selected SS block, and transmit a random access preamble corresponding to received preamble index information and/or mask index information for an available preamble and/or time/frequency resource.

The SRI information is information for giving a notification of at least a part of indices of one or multiple SRS transmission resources configured by the base station apparatus 3. Note that the SRI information may be bitmap information corresponding to one or multiple SRS transmission resources configured by the base station apparatus 3.

The terminal apparatus 1 may determine an antenna port for transmitting a random access preamble, based on received SRI information. Note that, in a case that the SRI information indicates multiple SRS transmission resources, the terminal apparatus 1 may transmit a random access preamble from each of multiple antenna ports based on the multiple SRS transmission resources. Note that the terminal apparatus 1 may use the antenna port associated with the SRS transmission resource indicated by the SRI information as an antenna port available for transmission and retransmission of a random access preamble. The terminal apparatus 1 may transmit a random access preamble using an uplink transmission beam (transmission spatial filter configuration) associated with the SRS transmission resource indicated by the SRI information. Note that the antenna port used to transmit a random access preamble by the terminal apparatus 1 that has received the SRI information through message 0 may be QCL with an antenna port associated with the SRS transmission resource indicated by the SRI information.

The SS block re-selection indication information is information indicating, for the terminal apparatus 1 that has received message 0, whether or not the SS block used for performing the random access procedure is re-selected. In other words, the SS block re-selection indication information is information indicating whether or not the SS block is selected based on measurement of one or multiple SS blocks. The SS block re-selection indication information may be referred to as reference signal re-selection indication information, and may be information indicating whether or not the reference signal is selected based on measurement of one or multiple reference signals. In a case of "no selection", a reference signal is selected based on the reference signal associated with the PDCCH used to receive information of message 0 and/or message 0.

In a case that the SS block re-selection indication information is indicated by message 0, the terminal apparatus 1 may monitor one or multiple SS blocks in the SS burst set, and transmit a random access preamble by using the random access configuration associated with the one selected SS block.

Note that the information indicated by the SS block re-selection indication information may be indicated by other information that is indicated by message 0. For example, the information indicated by the SS block re-selection indication information may be included in the preamble index information. The terminal apparatus 1 may re-select the SS block in a case that the preamble index indicated by message 0 has a prescribed value.

The random access configuration re-selection indication information is information indicating, for the terminal apparatus 1 that has received message 0, whether or not the random access configuration information used for performing the random access procedure is re-selected. The terminal apparatus 1 that has received the random access configuration re-selection indication information through message 0 may select one out of one or multiple pieces of random access configuration information received on the downlink signal, and may perform transmission of a random access preamble, based on the selected piece of random access configuration information.

Note that the information indicated by the random access configuration re-selection indication information may be indicated by other information that is indicated by message 0. For example, the information indicated by the random access configuration re-selection indication information may be included in the preamble index information. The terminal apparatus 1 may re-select the random access configuration information in a case that the preamble index indicated by message 0 has a prescribed value.

The CSI-RS selection indication information is information indicating, for the terminal apparatus 1 that has received message 0, that one used for performing the random access procedure out of one or multiple configured CSI-RSs is selected. The CSI-RS selection indication information may be information specifying at least a part of one or multiple CSI-RSs that are configured by the base station apparatus 3 for the terminal apparatus 1.

In a case that the CSI-RS selection indication information is indicated by message 0, the terminal apparatus 1 may monitor one or multiple configured CSI-RSs, and transmit a random access preamble by using the random access configuration associated with the one selected CSI-RS.

Note that the information indicated by the CSI-RS selection indication information may be indicated by other information that is indicated by message 0. For example, the information indicated by the CSI-RS selection indication information may be included in the preamble index information. The terminal apparatus 1 may monitor one or multiple CSI-RSs configured in a case that the preamble index indicated by the NR-PDCCH order has a prescribed value, and transmit a random access preamble by using the random access configuration associated with the one selected CSI-RS.

Note that one common piece of index information may be used for the preamble index information, the SRI information, the SS block re-selection indication information, the random access configuration re-selection indication information, and/or the CSI-RS selection indication information. For example, in a case that the common index information has a first value, the random access configuration information may not be re-selected, and in a case that the common index information has a second value, one or multiple CSI-RSs may be monitored.

Note that the RS type information is information for selecting a type of reference signal. For example, the RS type information indicates whether message 0 (which may be the PDCCH order) is associated with the SS block or associated with the CSI-RS. For example, the RS type information indicates whether a random access preamble specified by message 0 (which may be the NR-PDCCH order) is associated with the SS block or associated with the CSI-RS. For example, the RS type information indicates whether the RACH occasion used for transmission of message 1 by the terminal apparatus that has received message 0 (which may be the NR-PDCCH order) is associated with the SS block or associated with the CSI-RS.

Note that the TCI is a transmission configuration indicator (TCI), and one or multiple reference signals associated with the TCI are received by the terminal apparatus 1 from the base station apparatus 3 through the RRC message. Based on the TCI included in message 0 (which may be the NR-PDCCH order), one or multiple reference signals associated with the PDCCH used to receive message 0 are identified.

Message 1 (S802)

The terminal apparatus 1 that has received message 0 transmits a non-contention random access preamble assigned on the physical random access channel. The transmitted random access preamble may be referred to as message 1 or Msg 1. The random access preamble is configured such that information is notified to the base station apparatus 3 by using multiple sequences. For example, in a case that 64 types of sequences are available, 6-bit information can be provided to the base station apparatus 3. The information is provided as a Random Access preamble Identifier. The preamble sequence is selected out of a preamble sequence set using the preamble index.

Note that the terminal apparatus 1 may randomly select one random access preamble from available random access preambles in a case that the preamble index indicating a prescribed value (this may be, for example, a case that all the bits indicating the preamble index are 0) is indicated by message 0.

Note that, in a case that the mask index is indicated by message 0, the terminal apparatus 1 transmits a random access preamble by using the frequency resource and/or the time resource corresponding to the indicated mask index.

Note that, in a case that the SRI configuration information is indicated by message 0, the terminal apparatus 1 transmits one or multiple random access preambles by using antenna port(s) and/or uplink transmission beam(s) corresponding to one or multiple SRS transmission resources indicated by the SRI configuration information.

Message 2 (S803)

The base station apparatus 3 that has received message 1 generates a random access response including an uplink grant for indicating transmission to the terminal apparatus 1, and transmits the generated random access response to the terminal apparatus 1 on the DL-SCH. The random access response may be referred to as message 2 or Msg 2. Further, the base station apparatus 3 calculates a transmission timing difference between the terminal apparatus 1 and the base station apparatus 3 based on the received random access preamble, and includes transmission timing adjustment information (Timing Advance Command) for adjusting the difference in message 2. Further, the base station apparatus 3 includes a random access preamble identifier corresponding to the received random access preamble in message 2. Further, the base station apparatus 3 uses the downlink PCCH to transmit a Random Access-Radio Network Temporary Identity (RA-RNTI: random access response identification information) for indicating a random access response addressed to the terminal apparatus 1 that has transmitted the random access preamble. The RA-RNTI is determined according to frequency and time position information of the physical random access channel used to transmit the random access preamble. Here, message 2 (downlink PSCH) may include an index of the uplink transmission beam used to transmit the random access preamble. Further, information for determining an uplink transmission beam to be used to transmit message 3 using the downlink PCCH and/or message 2 (downlink PSCH) may be transmitted. Here, the information for determining an uplink transmission beam to be used to transmit message 3 may include information indicating a difference (adjustment, correction) from the index of precoding used to transmit the random access preamble.

Through the above transmission and/or reception of multiple messages, the terminal apparatus 1 can synchronize with the base station apparatus 3, and perform uplink data transmission to the base station apparatus 3.

Figure 10:
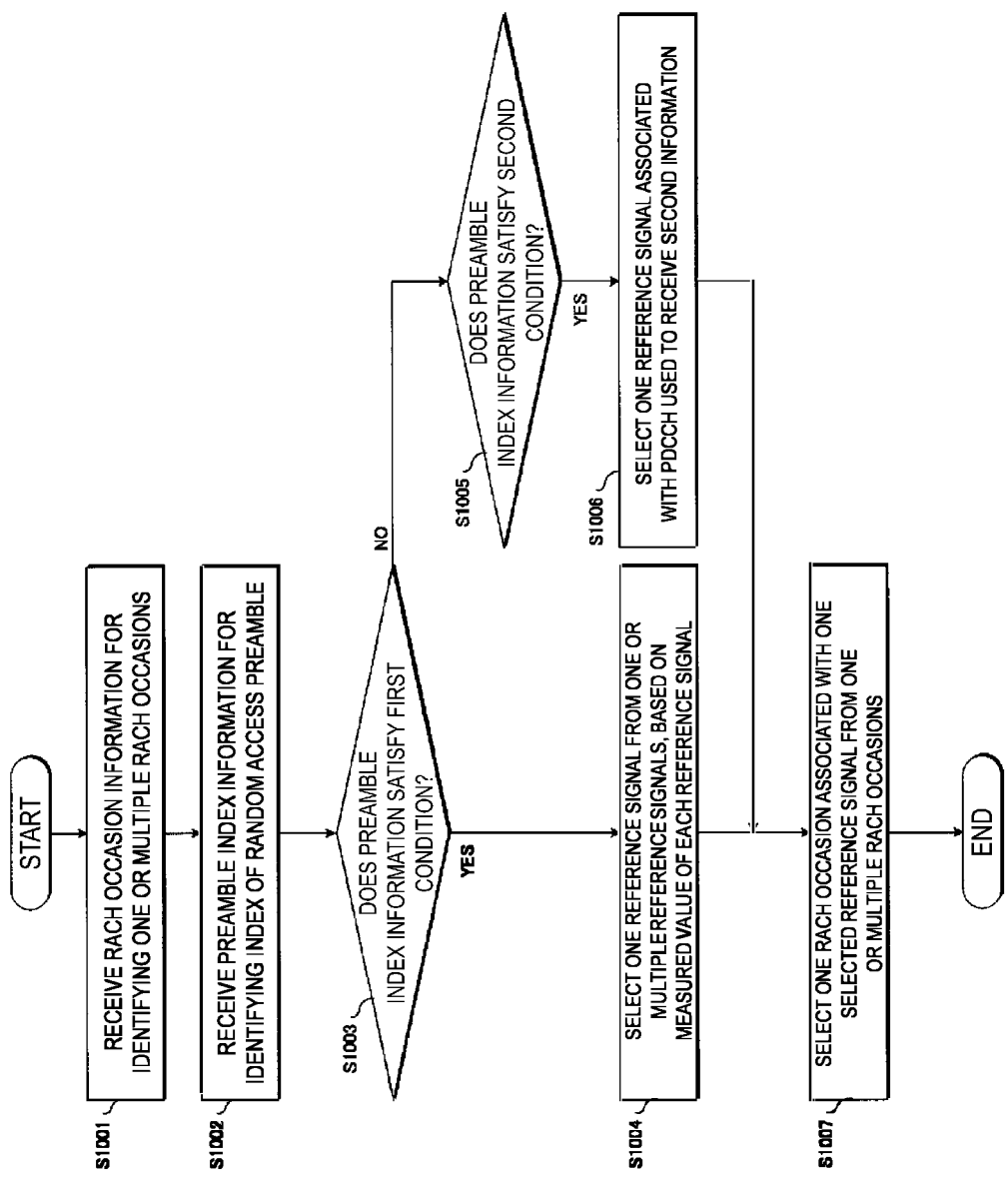
FIG. 10 is a flowchart illustrating an example of selection processing of a RACH occasion performed by the terminal apparatus 1 according to an embodiment of the present invention.

FIG. 10 is a flowchart illustrating an example of selection processing of the RACH occasion performed by the terminal apparatus 1 according to the present embodiment. Note that, in the following description, "to select a reference signal" may be interpreted as "to select an index of a reference signal (for example, an SS block index)". Note that, in the following description, "to select a reference signal" may be interpreted as "to select a QCL configuration associated with a reference signal".

The terminal apparatus 1 receives RACH occasion information for identifying one or multiple RACH occasions from the base station apparatus 3 (S1001). The RACH occasion information may be information for identifying one or multiple RACH occasions that are assigned for each reference signal. Note that the RACH occasion may be assigned for each of one or multiple QCL reference signals. Note that the RACH occasion information may be information for identifying one or multiple RACH occasions that are assigned for each index of the reference signals. The RACH occasion information may be notified through RRC.

The terminal apparatus 1 receives preamble index information for identifying an index of a random access preamble from the base station apparatus 3 (S1002). The preamble index information may be information indicating one preamble index. The preamble index information may be information indicating multiple preamble indices, in which one preamble index is assigned for each reference signal or each index of the reference signals. The preamble index information may be notified through RRC and/or on the PDCCH.

In a case that the received preamble index information satisfies a first condition (S1003—YES), the terminal apparatus 1 selects one reference signal from one or multiple reference signals, based on a measurement of each of the reference signals (S1004). Note that at least one type of the first condition may be a condition that the preamble index information has been received through RRC. Note that at least one type of the first condition may be a condition that the index of the random access preamble indicated by the received preamble index information has a prescribed value (this is, for example, a case that all the bits indicating the index are 0). Note that the measurement of each reference signal may be Reference Signal Received Power (RSRP) received by the terminal apparatus 1. For example, the terminal apparatus 1 may select a reference signal having the highest RSRP. For example, the terminal apparatus 1 may select one out of reference signals each having RSRP higher than a prescribed threshold.

In a case that the received preamble index information satisfies a second condition (S1005—YES), the terminal apparatus 1 selects one reference signal associated with the PDCCH used to receive the preamble index information (S1006). Note that at least one type of the second condition may be a condition that the preamble index information has been received on the PDCCH. Note that at least one type of the second condition may be a condition that the index of the random access preamble indicated by the received preamble index information does not have a prescribed value (this is, for example, a case that all the bits indicating the index are not 0). Note that the reference signal associated with the PDCCH may be a reference signal associated with a CORESET used to receive the PDCCH. Note that the reference signal associated with the PDCCH may be a reference signal associated with a QCL configuration used to monitor the PDCCH. These configurations are configured in the terminal apparatus 1 by receiving an RRC message including these associations. For example, the RRC message includes information configuring association between one or multiple downlink reference signals and one or multiple PDSCH DMRS ports identified by the TCI. Further, one or multiple reference signals associated with the PDCCH are identified by information associating the TCI and the CORESET. In another method, one or multiple reference signals associated with the PDCCH are identified based on the TCI included in the PDCCH. In a case that the TCI is associated with multiple reference signals, the index of a corresponding reference signal may be identified based on an index of a predetermined reference signal (for example, an SS block index) out of specified RS types and/or TCIs. In a case that the TCI is associated with multiple reference signals, a corresponding CSI-RS may be identified based on a predetermined CSI-RS out of specified RS types and/or TCIs.

The terminal apparatus 1 selects one RACH occasion associated with the one selected reference signal (or index of the reference signal) from one or multiple RACH occasions (S1007). Note that one RACH occasion associated with one reference signal may be one RACH occasion associated with a QCL configuration corresponding to the one reference signal.

Figure 11:
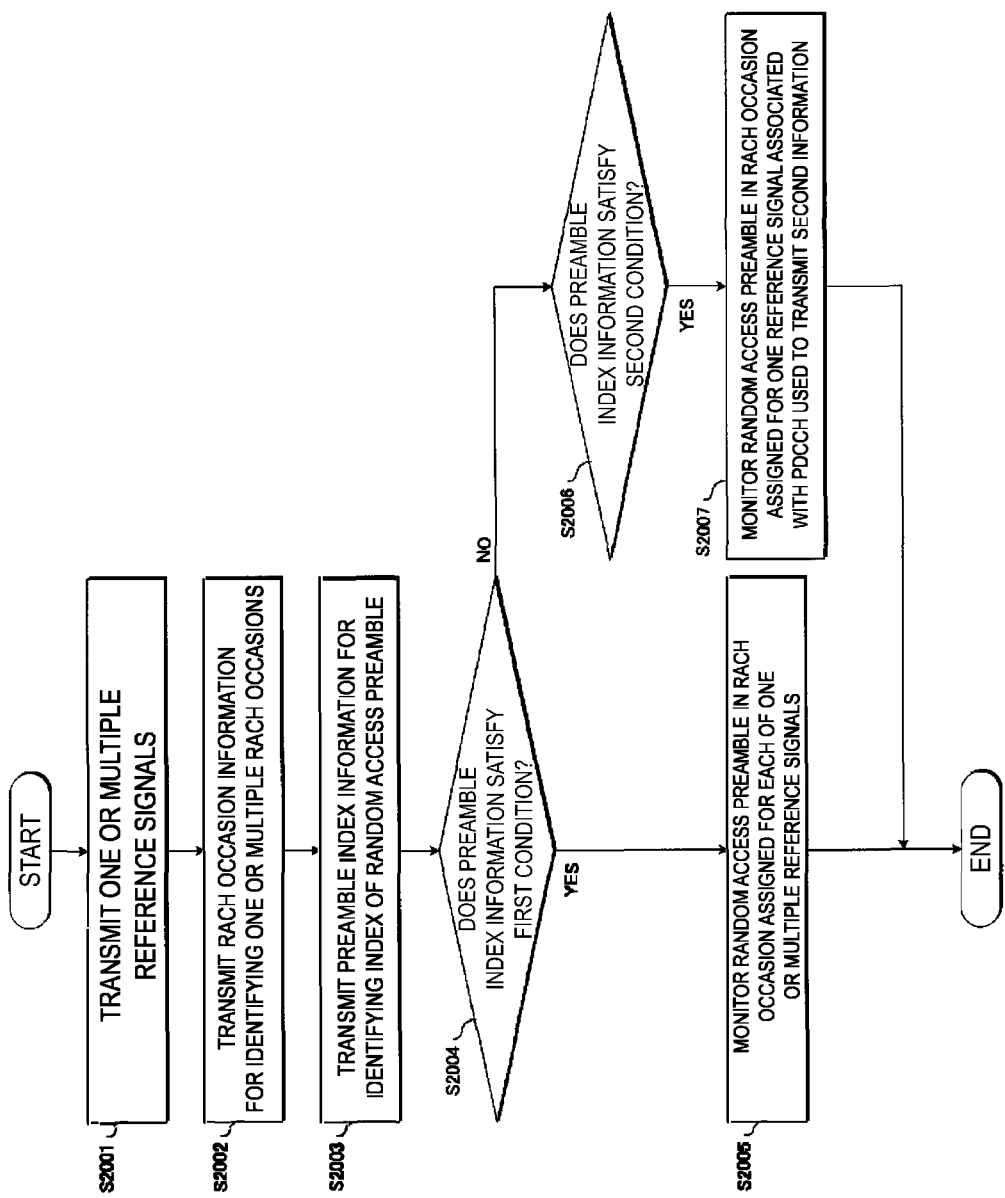
FIG. 11 is a flowchart illustrating an example of reception processing of a random access preamble performed by the base station apparatus 3 according to an embodiment of the present invention.

FIG. 11 is a flowchart illustrating an example of reception processing of the random access preamble performed by the base station apparatus 3 according to the present embodiment.

The base station apparatus 3 transmits one or multiple reference signals (S2001), transmits RACH occasion information for identifying one or multiple RACH occasions (S2002), and transmits preamble index information for identifying an index of a random access preamble (S2003).

In a case that the transmitted preamble index information satisfies a first condition (S2004—YES), the base station apparatus 3 monitors the random access preamble in the RACH occasions assigned for each of the one or multiple reference signals (S2005).

In a case that the transmitted preamble index information satisfies a second condition (S2005—YES), the base station apparatus 3 monitors the random access preamble in the RACH occasion assigned for one reference signal associated with the PDCCH used to transmit the preamble index information (S2006).

Figure 12:
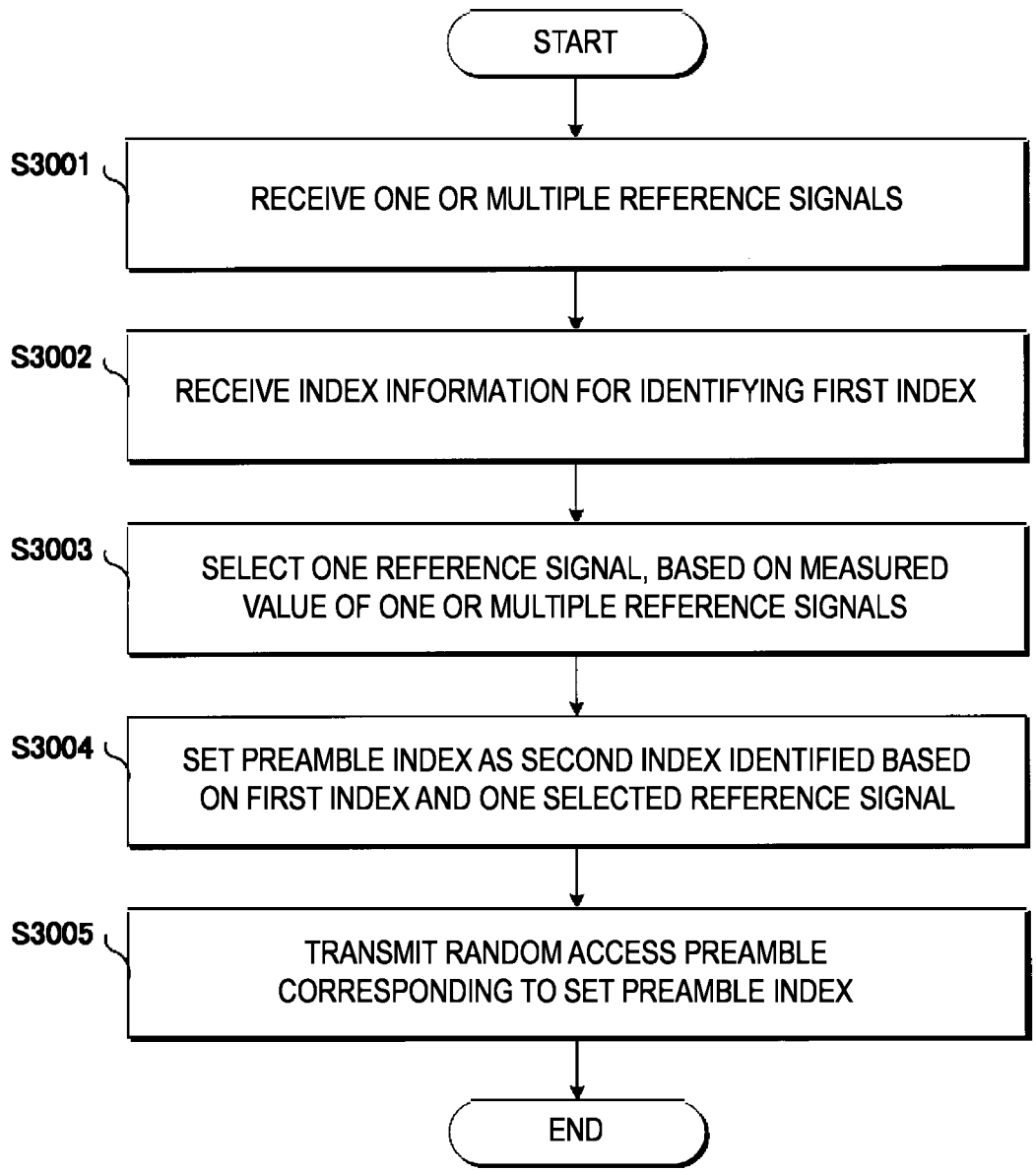
FIG. 12 is a flowchart illustrating an example of transmission processing of a random access preamble performed by the terminal station apparatus 1 according to an embodiment of the present invention.

FIG. 12 is a flowchart illustrating an example of transmission processing of the random access preamble performed by the terminal apparatus 1 according to the present embodiment.

The terminal apparatus 1 receives one or multiple reference signals (synchronization signals, SS blocks, and/or downlink reference signals) from the base station apparatus 3 (S3001).

The terminal apparatus 1 receives index information for identifying a first index (S3002). Note that the first index may be information indicating one of indices of available random access preambles. Note that the first index may be an index of a random access preamble associated with a specific reference signal or an index of the reference signal. Note that the index information may be received on the PDCCH and/or through RRC.

The terminal apparatus 1 selects one reference signal, based on measurement(s) of one or multiple reference signals (S3003). Note that the measurement of each reference signal may be reference signal received power (RSRP) received by the terminal apparatus 1. For example, the terminal apparatus 1 may select a reference signal having the highest RSRP. For example, the terminal apparatus 1 may select one out of reference signals each having RSRP higher than a prescribed threshold.

The terminal apparatus 1 sets a preamble index as a second index identified based on the first index and the one selected reference signal (S3004).

Note that the terminal apparatus 1 may receive preamble assignment information for identifying assignment of randomly selectable indices (indices available for a contention based random access) corresponding to each of the one or multiple reference signals. Note that the terminal apparatus 1 may receive offset information for identifying an offset value with respect to the first index corresponding to each of the one or multiple reference signals. The terminal apparatus 1 may identify the second index, based on the index information, the preamble assignment information, the offset information, and/or the one selected reference signal. The preamble assignment information may be notified through RRC. The offset information may be notified on the PDCCH.

The preamble assignment information may include information for identifying a RACH occasion that is assigned for each of the one or multiple reference signals (which may be indices of the reference signals or QCL configurations). The preamble assignment information may include the number (X) of preambles that can be selected in the contention based random access assigned for one reference signal (which may be an index of the reference signal or a QCL configuration). The information of second information may include a total number (Y) of preambles available in the contention based random access and preambles available in the non-contention based random access assigned for one reference signal. The second information may include the number (Z) of reference signals assigned for one RACH occasion. The second information may be notified through RRC. Note that Y may be a spacing of indices of preambles assigned at equal intervals for each reference signal. For example, in a case that Y is 10 and the first index is 9, the second index for each reference signal may be expressed by 9+10×A. Note that A is a value dependent on correspondence between a reference signal corresponding to the first index and the selected reference signal.

The offset information may include information for identifying a spacing of indices of preambles assigned at equal intervals for each reference signal. The offset information may include information for identifying an offset value with respect to the first index corresponding to each reference signal.

FIG. 13 illustrates an example of assignment of the preamble indices. FIG. 13 illustrates an example in which 64 types, from 0 to 63, of indices of random access preambles available in a certain RACH occasion are provided, and those are classified into preamble groups for the contention based random access corresponding to four reference signals (for example, SS blocks) and preamble groups for the non-contention based random access. In FIG. 13, indices 0 to 12 are provided for the contention based random access corresponding to the first reference signal, indices 16 to 28 are provided for the contention based random access corresponding to the second reference signal, indices 32 to 44 are provided for the contention based random access corresponding to the third reference signal, indices 48 to 63 are provided for the contention based random access corresponding to the fourth reference signal, and the other indices are provided for the non-contention based random access. Note that, in the figure, the preamble groups for the non-contention based random access are assigned between the preamble groups for the contention based random access corresponding to respective reference signals. However, the order of assignment is not limited to this order. Note that, in FIG. 13, specific reference signals are not assigned for the four preamble groups for the non-contention based random access. However, the preamble groups for the non-contention based random may be assigned for four reference signals. Note that FIG. 13 illustrates assignment of preamble indices in one RACH occasion. However, preamble indices in multiple RACH occasions may be assigned for multiple reference signals.

The terminal apparatus 1 may identify assignment as in FIG. 13 by being notified of at least a part of three pieces of information of X=13, Y=16, and Z=4 as the preamble assignment information.

The terminal apparatus 1 may identify that the index of the preamble for the non-contention based random access corresponding to the first reference signal is 14 in a case of being notified of 14 as the index information. The terminal apparatus 1 may identify the index of the preamble for the non-contention based random access corresponding to the second reference signal, the index of the preamble for the non-contention based random access corresponding to the third reference signal, and/or the index of the preamble for the non-contention based random access corresponding to the fourth reference signal, based on information notified in the index information and the preamble assignment information. For example, with Y (=16) representing a spacing of indices of preambles assigned at equal intervals for each reference signal, the index of the preamble for the non-contention based random access corresponding to the second reference signal may be identified as 14+16=30, the index of the preamble for the non-contention based random access corresponding to the third reference signal may be identified as 14+16*2=46, and the index of the preamble for the non-contention based random access corresponding to the fourth reference signal may be identified as 14+16*3=62. Note that 16 may be notified as a spacing of indices of preambles assigned at equal intervals for each reference signal with the offset information. Note that each of the offset of the second reference signal with respect to the first index, the offset of the third reference signal with respect to the first index, and/or the offset of the fourth reference signal with respect to the first index may be notified with the offset information. Note that preambles for the non-contention bale random access corresponding to multiple reference signals may be assigned in ascending order with respect to the indices included in the four preamble groups for the non-contention based random access in FIG. 13.

The terminal apparatus 1 transmits a random access preamble corresponding to the set preamble index to the base station apparatus 3 (S3005).

Figure 14:
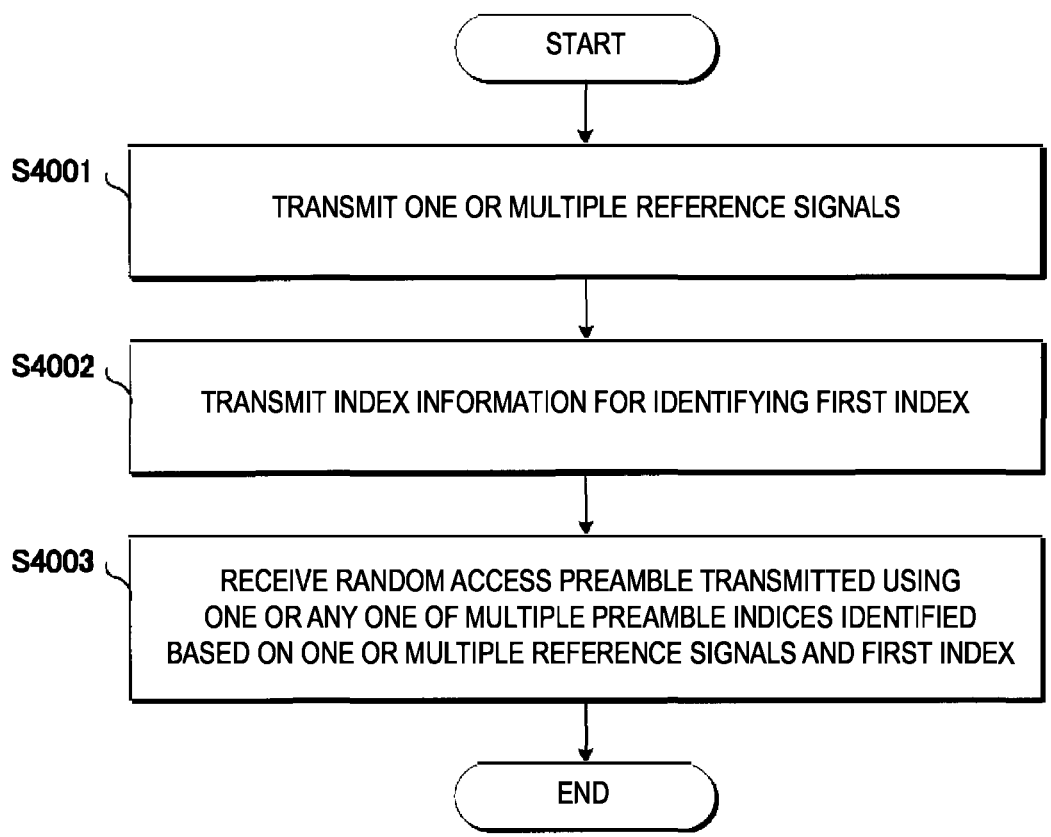
FIG. 14 is a flowchart illustrating another example of reception processing of a random access preamble performed by the base station apparatus 3 according to an embodiment of the present invention.

FIG. 14 is a flowchart illustrating another example of reception processing of the random access preamble performed by the base station apparatus 3 according to the present embodiment.

The base station apparatus 3 transmits one or multiple reference signals to the terminal apparatus 1 (S4001), and transmits index information for identifying the first index (S4002). The base station apparatus 3 receives a random access preamble transmitted using one or any one of multiple preamble indices identified based on the one or multiple reference signals and the first index (S4003).

Configurations of apparatuses according to the present embodiment will be described below.

Figure 15:
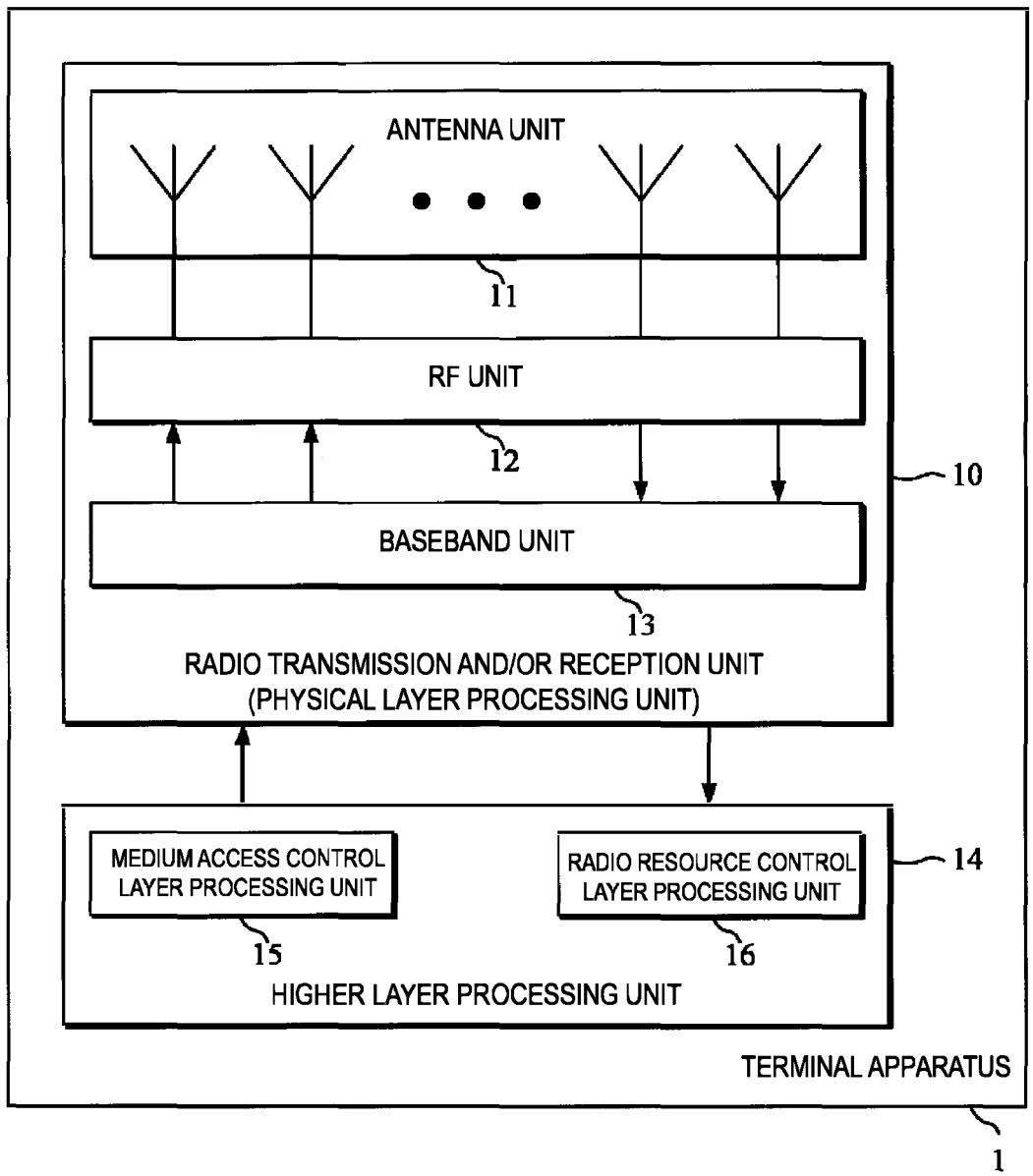
FIG. 15 is a schematic block diagram illustrating a configuration of the terminal apparatus 1 according to an embodiment of the present invention.

FIG. 15 is a schematic block diagram illustrating the configuration of the terminal apparatus 1 according to the present embodiment. As illustrated, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a monitor unit, or a physical layer processing unit. The higher layer processing unit 14 is also referred to as a measurement unit, a selection unit, or a controller.

The higher layer processing unit 14 outputs uplink data (which may be referred to as a transport block) generated by a user operation or the like, to the radio transmission and/or reception unit 10. The higher layer processing unit 14 performs some or all of the processings of the Medium Access Control (MAC) layer, the Packet Data Convergence Protocol (PDCP) layer, the Radio Link Control (RLC) layer, and the Radio Resource Control (RRC) layer. The higher layer processing unit 14 may have a function of selecting one reference signal from one or multiple reference signals, based on a measurement of each of the reference signals. The higher layer processing unit 14 may have a function of selecting one reference signal associated with a PDCCH used to receive information for identifying an index of a random access preamble in a case of a prescribed condition. The higher layer processing unit 14 may have a function of selecting one RACH occasion associated with the one selected reference signal from one or multiple RACH occasions in a case of a prescribed condition. The higher layer processing unit 14 may have a function of setting a preamble index as an index identified based on the index identified based on received information and one selected reference signal.

The medium access control layer processing unit 15 included in the higher layer processing unit 14 performs processing of the MAC layer (medium access control layer). The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the RRC layer (radio resource control layer). The radio resource control layer processing unit 16 manages various types of configuration information/parameters of the terminal apparatus 1. The radio resource control layer processing unit 16 sets various types of configuration information/parameters based on a higher layer signal received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3. The radio transmission and/or reception unit 10 may have a function of receiving one or multiple reference signals in a certain cell. The radio transmission and/or reception unit 10 may have a function of receiving information for identifying one or multiple RACH occasions. The radio transmission and/or reception unit 10 may have a function of receiving information for receiving information for identifying a prescribed index. The radio transmission and/or reception unit 10 may have a function of receiving information for identifying an index of a random access preamble. The radio transmission and/or reception unit 10 may have a function of transmitting a random access preamble.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Further, the RF unit 12 may have a function of determining transmit power of an uplink signal and/or an uplink channel to be transmitted in a serving cell. The RF unit 12 is also referred to as a transmit power control unit.

Figure 16:
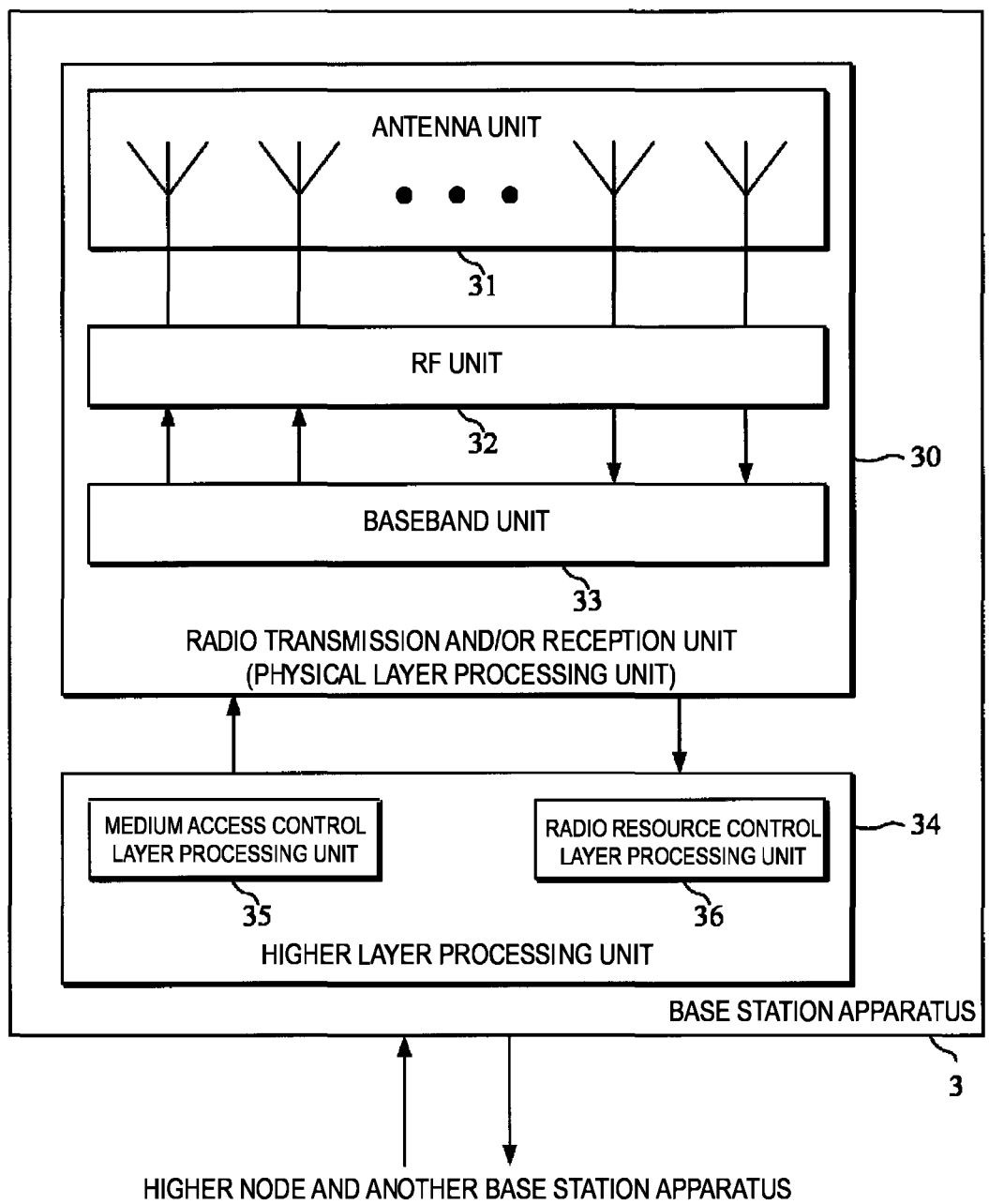
FIG. 16 is a schematic block diagram illustrating a configuration of the base station apparatus 3 according to an embodiment of the present invention.

FIG. 16 is a schematic block diagram illustrating the configuration of the base station apparatus 3 according to the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36.

The radio transmission and/or reception unit 30 is also referred to as a transmitter, a receiver or a physical layer processing unit. A controller controlling operations of the units based on various conditions may be separately provided. The higher layer processing unit 34 is also referred to as a terminal control unit.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the MAC layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the RRC layer. The radio resource control layer processing unit 36 generates, or acquires from a higher node, downlink data (transport block) allocated on a physical downlink shared channel, system information, an RRC message, a MAC Control Element (CE), and the like, and outputs the generated or acquired data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters. The radio resource control layer processing unit 36 may transmit/broadcast information for identifying configurations of multiple reference signals in a certain cell.

The radio transmission and/or reception unit 30 has a function of transmitting multiple reference signals. Further, the radio transmission and/or reception unit 30 may have a function of receiving, from the terminal apparatus 1, a scheduling request transmitted using any one of multiple scheduling request resources configured in the higher layer processing unit 34. Further, the radio transmission and/or reception unit 30 may have a function of transmitting one or multiple reference signals. The radio transmission and/or reception unit 30 may have a function of transmitting information for identifying one or multiple RACH occasions to the terminal apparatus 1. The radio transmission and/or reception unit 30 may have a function of transmitting information for identifying a prescribed index. The radio transmission and/or reception unit 30 may have a function of transmitting information for identifying an index of a random access preamble. The radio transmission and/or reception unit 30 may have a function of monitoring a random access preamble in a RACH occasion assigned for each of one or multiple reference signals in a case of a prescribed condition. The radio transmission and/or reception unit 30 may have a function of monitoring a random access preamble in a RACH occasion assigned for one reference signal associated with a PDCCH used to transmit information for identifying an index of a random access preamble in a case of a prescribed condition. In addition to the above, some functionality of the radio transmission and/or reception unit 30 is similar to the functionality of the radio transmission and/or reception unit 10, and hence description thereof is omitted. Note that in a case that the base station apparatus 3 is connected to one or more transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in FIG. 9, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an application layer processing unit exist in the higher layer processing unit 34. Further, the higher layer processing unit 34 may have a function of configuring multiple scheduling request resources corresponding to respective multiple reference signals transmitted from the radio transmission and/or reception unit 30.

Note that "units" in the drawing refer to constituent elements to realize the functions and the procedures of the terminal apparatus 1 and the base station apparatus 3, which are also represented by the terms such as a section, a circuit, a constituting apparatus, a device, a unit, and the like.

Each of the units having the reference signs 10 to 16 included in the terminal apparatus 1 may be configured as a circuit. Each of the units having the reference signs 30 to 36 included in the base station apparatus 3 may be configured as a circuit.

Aspects of the terminal apparatus 1 and the base station apparatus 3 according to one aspect of the present embodiment will be described below.

(1) A first aspect of the present invention is a terminal apparatus 1 including: a receiver 10 configured to receive first information (RACH occasion information) identifying one or multiple random access channel occasions (RACH occasions), and receive second information (preamble index information) identifying an index of a random access preamble; and a selection unit 14 configured to, in a case that a first condition is satisfied, select, from one or multiple reference signals, one reference signal (SS block) based on a measurement (RSRP) of each of the one or multiple reference signals, in a case that a second condition is satisfied, select one reference signal of the one or multiple reference signals associated with a physical downlink control channel (PDCCH) used to receive the second information (preamble index), and select, from the one or multiple random access channel occasions, one random access channel occasion associated with the one reference signal selected.

(2) In the first aspect of the present invention, the first condition may be a case that the second information is received through RRC, and the second condition may be a case that the second information is received on the physical downlink control channel (PDCCH).

(3) In the first aspect of the present invention, the first condition may be a condition that the index of the random access preamble indicated by the second information has a first value that is predetermined, and the second condition may be a condition that the index of the random access preamble indicated by the second information does not have the first value.

(4) A second aspect of the present invention is a terminal apparatus 1 including: a receiver 10 configured to receive one or multiple reference signals (SS blocks) and receive first information (index information) identifying a first index; a selection unit configured to select one reference signal of the one or multiple reference signals, based on a measurement (RSRP) of the one or multiple reference signals; a processing unit 14 configured to set a preamble index to a second index identified based on the first index and the one reference signal selected; and a transmitter 10 configured to transmit a random access preamble corresponding to the preamble index.

(5) In the second aspect of the present invention, the receiver 10 may further receive second information (preamble assignment information) identifying assignment of randomly selectable indices corresponding to each of the one or multiple reference signals, and the processing unit 14 may further identify the second index, based on the second information.

(6) In the second aspect of the present invention, the receiver 10 may further receive third information (offset information) identifying an offset value with respect to the first index corresponding to each of the one or multiple reference signals, and the processing unit 14 may further identify the second index by using the offset value with respect to the first index determined based on the one reference signal selected and the third information.

(7) A third aspect of the present invention is a base station apparatus 3 for communicating with a terminal apparatus 1, the base station apparatus 3 including: a transmitter 30 configured to transmit one or multiple reference signals, transmit first information (RACH occasion information) identifying one or multiple random access channel occasions (RACH occasions), and transmit second information (preamble index information) identifying an index of a random access preamble, to the terminal apparatus 1; and a monitor unit 30 configured to, in a case that a first condition is satisfied, monitor the random access preamble transmitted from the terminal apparatus 1 in a random access channel occasion of the one or multiple random access channel occasions assigned for each of the one or multiple reference signals, and in a case that a second condition is satisfied, monitor the random access preamble transmitted from the terminal apparatus 1 in the random access channel occasion assigned for one of the one or multiple reference signals associated with a physical downlink control channel (PDCCH) used to transmit the second information.

(8) A fourth aspect of the present invention is a base station apparatus 3 including: a transmitter 30 configured to transmit one or multiple reference signals and transmit first information (index information) identifying a first index; and a receiver 30 configured to receive a random access preamble transmitted using any one of one or multiple preamble indices identified based on the one or multiple reference signals and the first index.

A program running on an apparatus according to an aspect of the present invention may serve as a program that controls a Central Processing Unit (CPU) and the like to cause a computer to function in such a manner as to realize the functions of the embodiment according to the aspect of the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various functions of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B) Terminal apparatus
3 Base station apparatus
4 Transmission reception point (TRP)
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit
50 Transceiver unit (TXRU)
51 Phase shifter
52 Antenna element

The invention claimed is:

1. A terminal apparatus comprising:
reception circuitry configured to:
    receive first information for identifying one or multiple random access channel occasions, and
    receive second information for identifying an index of a random access preamble; and
selection circuitry configured to:
    in a case that a first condition is satisfied, select, from one or multiple reference signals, a first reference signal based on a measurement of each of the one or multiple reference signals,
    in a case that a second condition is satisfied, select a second reference signal associated with a physical downlink control channel used to receive the second information, and
    select, from the one or multiple random access channel occasions, one random access channel occasion associated with the selected first or second reference signal,
    wherein the first condition includes a case that the second information is received through a Radio Resource Control (RRC) message, and the second condition includes a case that the second information is received on the physical downlink control channel.

2. The terminal apparatus according to claim 1, wherein:
the first condition further includes a condition that the index of the random access preamble indicated by the second information has a first value that is predetermined, and
the second condition further includes a condition that the index of the random access preamble indicated by the second information does not have the first value.

3. A base station apparatus for communicating with a terminal apparatus, the base station apparatus comprising:
transmission circuitry configured to:
    transmit, to the terminal apparatus, one or multiple reference signals,
    transmit, to the terminal apparatus, first information for identifying one or multiple random access channel occasions, and transmit, to the terminal apparatus, second information for identifying an index of a random access preamble; and monitoring circuitry configured to:

in a case that a first condition is satisfied, monitor the random access preamble transmitted from the terminal apparatus in a random access channel occasion of the one or multiple random access channel occasions assigned for each of the one or multiple reference signals, and in a case that a second condition is satisfied, monitor the random access preamble transmitted from the terminal apparatus in the random access channel occasion assigned for one of the one or multiple reference signals associated with a physical downlink control channel used to transmit the second information, wherein the first condition includes a case that the second information is transmitted through a Radio Resource Control (RRC) message, and the second condition includes a case that the second information is transmitted on the physical downlink control channel.

4. A communication method used for a terminal apparatus, the communication method comprising:

receiving first information for identifying one or multiple random access channel occasions;

receiving second information for identifying an index of a random access preamble;

in a case that a first condition is satisfied, selecting, from one or multiple reference signals, a first reference signal based on a measurement of each of the one or multiple reference signals;

in a case that a second condition is satisfied, selecting a second reference signal signals associated with a physical downlink control channel used to receive the second information; and selecting, from the one or multiple random access channel occasions, one random access channel occasion associated with the selected first or second reference signal, wherein the first condition includes a case that the second information is received through a Radio Resource Control (RRC) message, and the second condition includes a case that the second information is received on the physical downlink control channel.

5. A communication method used for a base station apparatus, the communication method comprising:

transmitting, to the terminal apparatus, one or multiple reference signals;

transmitting, to the terminal apparatus, first information for identifying one or multiple random access channel occasions;

transmitting, to the terminal apparatus, second information for identifying an index of a random access preamble;

in a case that a first condition is satisfied, monitoring the random access preamble transmitted from the terminal apparatus in a random access channel occasion of the one or multiple random access channel occasions assigned for each of the one or multiple reference signals; and in a case that a second condition is satisfied, monitoring the random access preamble transmitted from the terminal apparatus in the random access channel occasion assigned for one of the one or multiple reference signals associated with a physical downlink control channel used to transmit the second information, wherein the first condition includes a case that the second information is transmitted through a Radio Resource Control (RRC) message, and the second condition includes a case that the second information is transmitted on the physical downlink control channel.

6. A terminal apparatus, comprising:

an integrated circuit configured to:

receive first information for identifying one or multiple random access channel occasions;

receive second information for identifying an index of a random access preamble;

in a case that a first condition is satisfied, select, from one or multiple reference signals, a first reference signal based on a measurement of each of the one or multiple reference signals;

in a case that a second condition is satisfied, select a second reference signal associated with a physical downlink control channel used to receive the second information; and select, from the one or multiple random access channel occasions, one random access channel occasion associated with the selected first or second reference signal, wherein the first condition includes a case that the second information is received through a Radio Resource Control (RRC) message, and the second condition includes a case that the second information is received on the physical downlink control channel.

7. A base station apparatus, comprising:

an integrated circuit configured to:

transmit, to the terminal apparatus, one or multiple reference signals;

transmit, to the terminal apparatus, first information for identifying one or multiple random access channel occasions;

transmit, to the terminal apparatus, second information for identifying an index of a random access preamble;

in a case that a first condition is satisfied, monitor the random access preamble transmitted from the terminal apparatus in a random access channel occasion of the one or multiple random access channel occasions assigned for each of the one or multiple reference signals; and in a case that a second condition is satisfied, monitor the random access preamble transmitted from the terminal apparatus in the random access channel occasion assigned for one of the one or multiple reference signals associated with a physical downlink control channel used to transmit the second information, wherein the first condition includes a case that the second information is transmitted through a Radio Resource Control (RRC) message, and the second condition includes a case that the second information is transmitted on the physical downlink control channel.

* * * * *